(12) United States Patent  
Liu

(10) Patent No.: US 12,348,269 B2
(45) Date of Patent: Jul. 1, 2025

(54) SINGLE-FIBER BIDIRECTIONAL OPTICAL TRANSMISSION APPARATUS, WAVELENGTH DIVISION MULTIPLEXING DEVICE, AND OPTICAL TRANSMISSION SYSTEM

(71) Applicant: Huawei Technologies Co., Ltd., Shenzhen (CN)

(72) Inventor: Wei Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 18/191,289

(22) Filed: Mar. 28, 2023

(65) Prior Publication Data

US 2023/0239052 A1  Jul. 27, 2023

Related U.S. Application Data

(63) Continuation of application No. PCT/CN2021/119666, filed on Sep. 22, 2021.

(30) Foreign Application Priority Data

Sep. 29, 2020  (CN) .......................... 202011052565.6

(51) Int. Cl.
*H04B 10/40* (2013.01)
*H04J 14/02* (2006.01)

(52) U.S. Cl.
CPC .......... *H04B 10/40* (2013.01); *H04J 14/0305* (2023.08)

(58) Field of Classification Search
CPC ................ H04B 10/40; H04B 10/2589; H04B 10/0773; H04B 10/43; H04J 14/0305; H04J 14/0228; H04J 14/02; H04J 14/0216

See application file for complete search history.

(56) References Cited

U.S. PATENT DOCUMENTS

2005/0025486 A1   2/2005  Zhong et al.
2015/0253509 A1*  9/2015  Pescod ................. H04B 10/032
                                                      398/45

(Continued)

FOREIGN PATENT DOCUMENTS

CN        2636504 Y    8/2004
CN      101179334 A    5/2008

(Continued)

*Primary Examiner* — Hibret A Woldekidan
(74) *Attorney, Agent, or Firm* — Slater Matsil, LLP

(57) ABSTRACT

A single-fiber bidirectional optical transmission apparatus, a wavelength division multiplexing device, and an optical transmission system, is disclosed. The single-fiber bidirectional optical transmission apparatus includes: a first single-light-source coherent optical transceiver, configured to: receive a first optical signal from a first multiplexer/demultiplexer, convert the first optical signal into a first electrical signal, and send the first electrical signal to a first client signal processing apparatus; and a second single-light-source coherent optical transceiver, configured to: receive a second electrical signal from the first client signal processing apparatus, convert the second electrical signal into a second optical signal, and send the second optical signal to the first multiplexer/demultiplexer. A wavelength of the second optical signal is different from a wavelength of the first optical signal.

20 Claims, 22 Drawing Sheets

(56) References Cited

U.S. PATENT DOCUMENTS

| | | |
|---|---|---|
| 2017/0214463 A1 | 7/2017 | Milione et al. |
| 2019/0052392 A1* | 2/2019 | DeAndrea ............ H04J 14/0228 |
| 2019/0120663 A1* | 4/2019 | Suzaki ................... H04B 10/85 |
| 2019/0181952 A1* | 6/2019 | Jia ........................ H04J 14/0279 |
| 2020/0204258 A1 | 6/2020 | Bravi |

FOREIGN PATENT DOCUMENTS

| | | |
|---|---|---|
| CN | 103338088 A | 10/2013 |
| CN | 204481832 U | 7/2015 |
| CN | 204481833 U | 7/2015 |
| CN | 108933628 A | 12/2018 |
| CN | 109525908 A | 3/2019 |
| TW | 200821651 A | 5/2008 |
| TW | I321223 B | 3/2010 |
| WO | 8706084 A1 | 10/1987 |

* cited by examiner

SINGLE-FIBER BIDIRECTIONAL OPTICAL TRANSMISSION APPARATUS, WAVELENGTH DIVISION MULTIPLEXING DEVICE, AND OPTICAL TRANSMISSION SYSTEM

CROSS-REFERENCE TO RELATED APPLICATIONS

This application is a continuation of International Application No. PCT/CN2021/119666, filed on Sep. 22, 2021, which claims priority to Chinese Patent Application No. 202011052565.6, filed on Sep. 29, 2020. The disclosures of the aforementioned applications are hereby incorporated by reference in their entireties.

TECHNICAL FIELD

This application relates to the field of optoelectronic technologies, and in particular, to a single-fiber bidirectional optical transmission apparatus, a wavelength division multiplexing device, and an optical transmission system.

BACKGROUND

With shortage of optical fiber resources, a single-fiber bidirectional technology is widely used. The "single-fiber bidirectional" means that there is only one optical fiber between two stations, and the optical fiber is configured to transmit optical signals in two directions. For example, FIG. 1 is a schematic diagram of an existing single-fiber bidirectional application scenario. There is only an optical fiber A between a station 1 and a station 2. The optical fiber A is configured to transmit an optical signal from the station 1 to the station 2, and may also be configured to transmit an optical signal from the station 2 to the station 1.

Currently, the "single-fiber bidirectional" includes two solutions: a non-coherent optical transceiver and a dual-light-source coherent optical transceiver. The non-coherent optical transceiver currently supports only low-rate optical transmission, and the dual-light-source coherent optical transceiver may support high-rate optical transmission. Therefore, as demands for high-rate optical transmission grow, the dual-light-source coherent optical transceiver solution is increasingly used. FIG. 2 is a schematic diagram of a structure of an existing dual-light-source coherent optical transceiver. The dual-light-source coherent optical transceiver includes a continuous wave (CW) light source at a transmit end and a local oscillator (local oscillator, LO) light source at a receive end. The CW light source is provided for use by a modulator at the transmit end. The LO light source is provided for used by an integrated coherent receiver (ICR) at the receive end, where the ICR is configured to demodulate an optical signal at the receive end to obtain an intra-frequency signal. In addition, the dual-light-source coherent optical transceiver further includes an optical digital signal processor (oDSP) and an electrical interface. The oDSP is configured to: perform forward error correction (forward error correction, FEC) enhancement on a transmit-end electrical signal and then decompose the electrical signal and send the electrical signal to the modulator at the transmit end, and perform a de-FEC function on a receive-end electrical signal and then send the electrical signal to the electrical interface. The electrical interface is configured to output an electrical signal.

With development of technologies, a coherent optical transceiver has a smaller size. A miniaturized coherent optical transceiver has only one laser (which may be considered as a single light source) because a size is too small to place two lasers (that is, dual light sources cannot be provided). For example, FIG. 3 is a schematic diagram of a structure of a miniaturized single-light-source coherent optical transceiver. Compared with a framework diagram of the dual-light-source coherent optical transceiver shown in FIG. 2, a framework diagram of the miniaturized single-light-source coherent optical transceiver includes only one CW light source corresponding to a laser. The CW light source is split into two beams of light sources by using an optical splitter. One beam of light source is provided for use by a modulator at a transmit end, and the other beam of light source is provided for use by an ICR at a receive end, where the ICR is configured to demodulate an optical signal at the receive end to obtain an intra-frequency signal. In this working mode, transmit and receive wavelengths are definitely the same. However, in the single-fiber bidirectional technology, wavelengths of optical signals in two directions are two different wavelengths allowed to be transmitted by a single optical fiber. If wavelengths of optical signals in two directions are the same, optical signals in neither direction can be transmitted. Therefore, the existing single-fiber bidirectional technology cannot use the miniaturized single-light-source coherent optical transceiver.

SUMMARY

Embodiments of this application provide a single-fiber bidirectional optical transmission apparatus, a wavelength division multiplexing device, and an optical transmission system, to implement single-fiber bidirectional optical transmission by using miniaturized single-light-source coherent optical transceivers.

According to a first aspect, an embodiment of this application provides a single-fiber bidirectional optical transmission apparatus. The single-fiber bidirectional optical transmission apparatus includes: a first single-light-source coherent optical transceiver, configured to: receive a first optical signal from a first multiplexer/demultiplexer, convert the first optical signal into a first electrical signal, and send the first electrical signal to a first client signal processing apparatus; and a second single-light-source coherent optical transceiver, configured to: receive a second electrical signal from the first client signal processing apparatus, convert the second electrical signal into a second optical signal, and send the second optical signal to the first multiplexer/demultiplexer. A wavelength of the second optical signal is different from a wavelength of the first optical signal. Different from a solution in a conventional technology in which single-fiber bidirectional optical transmission is implemented by using a dual-light-source coherent optical transceiver, the single-fiber bidirectional optical transmission apparatus in this embodiment of this application includes two single-light-source coherent optical transceivers. As the second single-light-source coherent optical transceiver sends the second optical signal to the first multiplexer/demultiplexer, and the first single-light-source coherent optical transceiver receives the first optical signal from the first multiplexer/demultiplexer, it can be learned that an optical output end of the second single-light-source coherent optical transceiver and an optical input end of the first single-light-source coherent optical transceiver are connected to a transceiver port of a same single-fiber bidirectional multiplexer/demultiplexer. In addition, as the second single-light-source coherent optical transceiver receives the second electrical signal from the first client signal processing apparatus, and the first single-light-source coherent optical transceiver sends the first electrical signal to the first client signal processing apparatus, it can be learned that an electrical input end of the second single-light-source coherent optical transceiver and an electrical output end of the first single-light-source coherent optical transceiver are connected to a same client signal processing apparatus. In addition, because wavelengths of optical signals of the first single-light-source coherent optical transceiver and the second single-light-source coherent optical transceiver are different, it is equivalent to obtaining a virtual dual-light-source module. Therefore, the single-fiber bidirectional optical transmission apparatus can implement one channel of single-fiber bidirectional optical transmission. In conclusion, in this embodiment of this application, one channel of single-fiber bidirectional optical transmission may be implemented by using miniaturized single-light-source coherent optical transceivers.

In a possible design, the single-fiber bidirectional optical transmission apparatus further includes a framing chip, configured to receive the first electrical signal from the first single-light-source coherent optical transceiver, and send a processed first electrical signal to the first client signal processing apparatus. The framing chip is further configured to receive an unprocessed second electrical signal from the first client signal processing apparatus, and send the second electrical signal to the second single-light-source coherent transceiver. The framing chip is further configured to provide a second clock signal to the second single-light-source coherent transceiver. The second clock signal is extracted by the framing chip from the unprocessed second electrical signal received from the first client signal processing apparatus. It should be understood that the second clock signal required when the second single-light-source coherent optical transceiver converts the second electrical signal into the second optical signal is provided by the framing chip. Certainly, alternatively, a working mode of the second single-light-source coherent optical transceiver may be set to a self-recovery clock mode, so that the second clock signal required when the second single-light-source coherent optical transceiver converts the second electrical signal into the second optical signal is generated by the second single-light-source coherent optical transceiver. This is not specifically limited in this embodiment of this application.

In a possible design, the single-fiber bidirectional optical transmission apparatus further includes the first multiplexer/demultiplexer. In this design, there is only one optical port in a direction from the first client signal processing apparatus to the first multiplexer/demultiplexer, and the optical port allows transmission of optical signals in two directions. This solution features convenient fiber connection and no need to configure a fiber connection manner. In another possible design, the single-fiber bidirectional optical transmission apparatus is connected to the first multiplexer/demultiplexer. In this design, in a direction from the first client signal processing apparatus to the first multiplexer/demultiplexer, the single-fiber bidirectional optical transmission apparatus needs two optical ports respectively configured to input and output optical signals. This solution features subsequent compatibility with an existing function of implementing dual-fiber bidirectional optical transmission by using single-light-source coherent optical transceivers, and more flexibility.

In a possible design, the single-fiber bidirectional optical transmission apparatus further includes the first client signal processing apparatus. In another possible design, the single-fiber bidirectional optical transmission apparatus is connected to the first client signal processing apparatus.

In a possible design, the second single-light-source coherent optical transceiver is further configured to: receive a third optical signal from a second multiplexer/demultiplexer, convert the third optical signal into a third electrical signal, and send the third electrical signal to a second client signal processing apparatus. A wavelength of the third optical signal is the same as the wavelength of the second optical signal, but the optical signals are in opposite directions. The first single-light-source coherent optical transceiver is further configured to: receive a fourth electrical signal from the second client signal processing apparatus, convert the fourth electrical signal into a fourth optical signal, and send the fourth optical signal to the second multiplexer/demultiplexer. A wavelength of the fourth optical signal is the same as the wavelength of the first optical signal, but the optical signals are in opposite directions. In this solution, as the first single-light-source coherent optical transceiver sends the fourth optical signal to the second multiplexer/demultiplexer, and the second single-light-source coherent optical transceiver receives the third optical signal from the second multiplexer/demultiplexer, it can be learned that an optical input end of the second single-light-source coherent optical transceiver and an optical output end of the first single-light-source coherent optical transceiver are connected to a transceiver port of a same single-fiber bidirectional multiplexer/demultiplexer. In addition, as the first single-light-source coherent optical transceiver receives the fourth electrical signal from the second client signal processing apparatus, and the second single-light-source coherent optical transceiver sends the third electrical signal to the second client signal processing apparatus, it can be learned that an electrical output end of the second single-light-source coherent optical transceiver and an electrical input end of the first single-light-source coherent optical transceiver are connected to a same client signal processing apparatus. In addition, because wavelengths of optical signals of the first single-light-source coherent optical transceiver and the second single-light-source coherent optical transceiver are different, it is equivalent to first obtaining one virtual dual-light-source module in the single-fiber bidirectional optical transmission apparatus and then obtaining another virtual dual-light-source module with paired wavelengths. Therefore, the single-fiber bidirectional optical transmission apparatus can implement two channels of single-fiber bidirectional optical transmission. In conclusion, in this embodiment of this application, two channels of single-fiber bidirectional optical transmission may be implemented by using miniaturized single-light-source coherent optical transceivers.

In a possible design, the single-fiber bidirectional optical transmission apparatus further includes: a receive-end signal distribution circuit, configured to: receive the first electrical signal from the first single-light-source coherent optical transceiver by using a first electrical input end, and receive the third electrical signal from the second single-light-source coherent optical transceiver by using a second electrical input end; and a control circuit, configured to: control the receive-end signal distribution circuit to output the first electrical signal from a first electrical output end of the receive-end signal distribution circuit, and control the receive-end signal distribution circuit to output the third electrical signal from a second electrical output end of the receive-end signal distribution circuit. The first electrical output end of the receive-end signal distribution circuit is connected to an electrical input end of the first client signal processing apparatus. The second electrical output end of the receive-end signal distribution circuit is connected to an electrical input end of the second client signal processing apparatus. This solution can improve scalability of the single-fiber bidirectional optical transmission apparatus.

In a possible design, the single-fiber bidirectional optical transmission apparatus further includes: a framing chip, configured to receive the first electrical signal from the receive-end signal distribution circuit, and send a processed first electrical signal to the first client signal processing apparatus. The framing chip is further configured to receive an unprocessed second electrical signal from the first client signal processing apparatus, and send the second electrical signal to the second single-light-source coherent transceiver. The framing chip is further configured to receive the third electrical signal from the receive-end signal distribution circuit, and send a processed third electrical signal to the second client signal processing apparatus. The framing chip is further configured to receive an unprocessed fourth electrical signal from the second client signal processing apparatus, and send the fourth electrical signal to the first single-light-source coherent transceiver. The framing chip is further configured to provide a first clock signal to the first single-light-source coherent transceiver, and provide a second clock signal to the second single-light-source coherent transceiver. The first clock signal is extracted by the framing chip from the unprocessed fourth electrical signal received from the second client signal processing apparatus. The second clock signal is extracted by the framing chip from the unprocessed second electrical signal received from the first client signal processing apparatus. In other words, in this embodiment of this application, the first clock signal required when the first single-light-source coherent optical transceiver converts the fourth electrical signal into the fourth optical signal is provided by the framing chip, and the second clock signal required when the second single-light-source coherent optical transceiver converts the second electrical signal into the second optical signal is provided by the framing chip. Certainly, alternatively, in this embodiment of this application, working modes of the first single-light-source coherent optical transceiver and the second single-light-source coherent optical transceiver may be set to a self-recovery clock mode, so that the first clock signal required when the first single-light-source coherent optical transceiver converts the fourth electrical signal into the fourth optical signal is generated by the first single-light-source coherent optical transceiver, and the second clock signal required when the second single-light-source coherent optical transceiver converts the second electrical signal into the second optical signal is generated by the second single-light-source coherent optical transceiver. This is not specifically limited in this embodiment of this application.

In a possible design, the single-fiber bidirectional optical transmission apparatus further includes the first multiplexer/demultiplexer and the second multiplexer/demultiplexer. In this design, there is only one optical port in a direction from the second client signal processing apparatus to the second multiplexer/demultiplexer, there is only one optical port in a direction from the first client signal processing apparatus to the first multiplexer/demultiplexer, and each optical port allows transmission of optical signals in two directions. This solution features convenient fiber connection and no need to configure a fiber connection manner. In another possible design, the single-fiber bidirectional optical transmission apparatus is connected to the first multiplexer/demultiplexer and the second multiplexer/demultiplexer. In this design, in a direction from the second client signal processing apparatus to the second multiplexer/demultiplexer, the single-fiber bidirectional optical transmission apparatus needs two optical ports. In a direction from the first client signal processing apparatus to the first multiplexer/demultiplexer, the single-fiber bidirectional optical transmission apparatus needs two optical ports. In each pair of optical ports, one optical port is configured to input an optical signal, and the other optical port is configured to output an optical signal. This solution features subsequent compatibility with an existing function of implementing dual-fiber bidirectional optical transmission by using single-light-source coherent optical transceivers, and more flexibility.

In a possible design, the single-fiber bidirectional optical transmission apparatus further includes the second client signal processing apparatus and the first client signal processing apparatus. In another possible design, the single-fiber bidirectional optical transmission apparatus is connected to the second client signal processing apparatus and the first client signal processing apparatus.

According to a second aspect, a single-fiber bidirectional optical transmission apparatus is provided. The single-fiber bidirectional optical transmission apparatus includes: a first single-light-source coherent transceiver, configured to: receive a first electrical signal from a first client signal processing apparatus, convert the first electrical signal into a first optical signal, and send the first optical signal to a first multiplexer/demultiplexer; and a second single-light-source coherent transceiver, configured to: receive a second optical signal from the first multiplexer/demultiplexer, convert the second optical signal into a second electrical signal, and send the second electrical signal to the first client signal processing apparatus. A wavelength of the second optical signal is different from a wavelength of the first optical signal. Different from a solution in a conventional technology in which single-fiber bidirectional optical transmission is implemented by using a dual-light-source coherent optical transceiver, the single-fiber bidirectional optical transmission apparatus in this embodiment of this application includes two single-light-source coherent optical transceivers. As the first single-light-source coherent optical transceiver sends the first optical signal to the first multiplexer/demultiplexer, and the second single-light-source coherent optical transceiver receives the second optical signal from the first multiplexer/demultiplexer, it can be learned that an optical input end of the second single-light-source coherent optical transceiver and an optical output end of the first single-light-source coherent optical transceiver are connected to a transceiver port of a same single-fiber bidirectional multiplexer/demultiplexer. In addition, as the first single-light-source coherent optical transceiver receives the first electrical signal from the first client signal processing apparatus, and the second single-light-source coherent optical transceiver sends the second electrical signal to the first client signal processing apparatus, it can be learned that an electrical output end of the second single-light-source coherent optical transceiver and an electrical input end of the first single-light-source coherent optical transceiver are connected to a same client signal processing apparatus. In addition, because wavelengths of optical signals of the first single-light-source coherent optical transceiver and the second single-light-source coherent optical transceiver are different, it is equivalent to obtaining a virtual dual-light-source module. Therefore, the single-fiber bidirectional optical transmission apparatus can implement one channel of single-fiber bidirectional optical transmission. In conclusion, in this embodiment of this application, one channel of single-fiber bidirectional optical transmission may be implemented by using miniaturized single-light-source coherent optical transceivers.

In a possible design, the single-fiber bidirectional optical transmission apparatus further includes a framing chip, configured to: receive an unprocessed first electrical signal from the first client signal processing apparatus, and send the first electrical signal to the first single-light-source coherent transceiver. The framing chip is further configured to receive the second electrical signal from the second single-light-source coherent transceiver, and send a processed second electrical signal to the first client signal processing apparatus. The framing chip is further configured to provide a second clock signal to the first single-light-source coherent transceiver. The second clock signal is extracted by the framing chip from the unprocessed first electrical signal received from the first client signal processing apparatus. It should be understood that the second clock signal required when the first single-light-source coherent optical transceiver converts the first electrical signal into the first optical signal is provided by the framing chip. This can ensure that a transmit-end optical signal and a client-side signal have a same clock source, thereby ensuring that a service of the single-fiber bidirectional optical transmission apparatus is normal. Certainly, alternatively, a working mode of the first single-light-source coherent optical transceiver may be set to a self-recovery clock mode, so that the second clock signal required when the first single-light-source coherent optical transceiver converts the first electrical signal into the first optical signal is generated by the first single-light-source coherent optical transceiver. This is not specifically limited in this embodiment of this application.

In a possible design, the single-fiber bidirectional optical transmission apparatus further includes the first multiplexer/demultiplexer. For a technical effect of this design, refer to the first aspect. Details are not described herein again. In another possible design, the single-fiber bidirectional optical transmission apparatus is connected to the first multiplexer/demultiplexer. For a technical effect of this design, refer to the first aspect. Details are not described herein again.

In a possible design, the single-fiber bidirectional optical transmission apparatus further includes the first client signal processing apparatus. In another possible design, the single-fiber bidirectional optical transmission apparatus is connected to the first client signal processing apparatus.

In a possible design, the second single-light-source coherent transceiver is further configured to: receive a third electrical signal from a second client signal processing apparatus, convert the third electrical signal into a third optical signal, and send the third optical signal to a second multiplexer/demultiplexer. A wavelength of the third optical signal is the same as the wavelength of the second optical signal, but the optical signals are in opposite directions. The first single-light-source coherent transceiver is further configured to: receive a fourth optical signal from the second multiplexer/demultiplexer, convert the fourth optical signal into a fourth electrical signal, and send the fourth electrical signal to the second client signal processing apparatus. A wavelength of the fourth optical signal is the same as the wavelength of the first optical signal, but the optical signals are in opposite directions. In this solution, as the second single-light-source coherent optical transceiver sends the third optical signal to the second multiplexer/demultiplexer, and the first single-light-source coherent optical transceiver receives the fourth optical signal from the second multiplexer/demultiplexer, it can be learned that an optical output end of the second single-light-source coherent optical transceiver and an optical input end of the first single-light-source coherent optical transceiver are connected to a transceiver port of a same single-fiber bidirectional multiplexer/demultiplexer. In addition, as the second single-light-source coherent optical transceiver receives the third electrical signal from the second client signal processing apparatus, and the first single-light-source coherent optical transceiver sends the fourth electrical signal to the second client signal processing apparatus, it can be learned that an electrical input end of the second single-light-source coherent optical transceiver and an electrical output end of the first single-light-source coherent optical transceiver are connected to a same client signal processing apparatus. In addition, because wavelengths of optical signals of the first single-light-source coherent optical transceiver and the second single-light-source coherent optical transceiver are different, it is equivalent to first obtaining one virtual dual-light-source module in the single-fiber bidirectional optical transmission apparatus and then obtaining another virtual dual-light-source module with paired wavelengths. Therefore, the single-fiber bidirectional optical transmission apparatus can implement two channels of single-fiber bidirectional optical transmission. In conclusion, in this embodiment of this application, two channels of single-fiber bidirectional optical transmission may be implemented by using miniaturized single-light-source coherent optical transceivers.

In a possible design, the single-fiber bidirectional optical transmission apparatus further includes: a transmit-end signal distribution circuit, configured to: receive the first electrical signal from the first client signal processing apparatus by using a first electrical input end, and receive the third electrical signal from the second client signal processing apparatus by using a second electrical input end; and a control circuit, configured to: control the transmit-end signal distribution circuit to output the first electrical signal from a first electrical output end of the transmit-end signal distribution circuit, and control the transmit-end signal distribution circuit to output the third electrical signal from a second electrical output end of the transmit-end signal distribution circuit. The first electrical output end of the transmit-end signal distribution circuit is connected to an electrical input end of the first single-light-source coherent transceiver, and the second electrical output end of the transmit-end signal distribution circuit is connected to an electrical input end of the second single-light-source coherent transceiver. This solution can improve scalability of the single-fiber bidirectional optical transmission apparatus.

In a possible design, the single-fiber bidirectional optical transmission apparatus further includes: a framing chip, configured to receive an unprocessed first electrical signal from the first client signal processing apparatus, and send the first electrical signal to the transmit-end signal distribution circuit. The framing core is further configured to receive the second electrical signal from the second single-light-source coherent transceiver, and send a processed second electrical signal to the first client signal processing apparatus. The framing chip is further configured to receive an unprocessed third electrical signal from the second client signal processing apparatus, and send the third electrical signal to the transmit-end signal distribution circuit. The framing chip is further configured to: receive the fourth electrical signal from the first single-light-source coherent transceiver, and send a processed fourth electrical signal to the second client signal processing apparatus. The framing chip is further configured to provide a first clock signal to the second single-light-source coherent transceiver, and provide a second clock signal to the first single-light-source coherent transceiver. The first clock signal is extracted by the framing chip from the unprocessed third electrical signal received from the second client signal processing apparatus. The second clock signal is extracted by the framing chip from the unprocessed first electrical signal received from the first client signal processing apparatus. It should be understood that, the second clock signal required when the first single-light-source coherent optical transceiver converts the first electrical signal into the first optical signal is provided by the framing chip, and the first clock signal required when the second single-light-source coherent optical transceiver converts the third electrical signal into the third optical signal is provided by the framing chip. This can ensure that a transmit-end optical signal and a client-side signal have a same clock source, thereby ensuring that a service of the single-fiber bidirectional optical transmission apparatus is normal. Certainly, alternatively, in this embodiment of this application, working modes of the first single-light-source coherent optical transceiver and the second single-light-source coherent optical transceiver may be set to a self-recovery clock mode, so that the second clock signal required when the first single-light-source coherent optical transceiver converts the first electrical signal into the first optical signal is generated by the first single-light-source coherent optical transceiver, and the first clock signal required when the second single-light-source coherent optical transceiver converts the third electrical signal into the third optical signal is generated by the second single-light-source coherent optical transceiver. This is not specifically limited in this embodiment of this application.

In a possible implementation, the single-fiber bidirectional optical transmission apparatus further includes a clock signal distribution circuit. That the framing chip is configured to provide a first clock signal to the second single-light-source coherent transceiver, and provide a second clock signal to the first single-light-source coherent transceiver includes: being configured to provide the first clock signal to a first clock input end of the clock signal distribution circuit, and provide the second clock signal to a second clock input end of the clock signal distribution circuit. The control circuit is further configured to: control the clock signal distribution circuit to output the first clock signal from a second clock output end of the clock signal distribution circuit, and control the clock signal distribution circuit to output the second clock signal from a first clock output end of the clock signal distribution circuit. The first clock output end of the clock signal distribution circuit is connected to a clock input end of the first single-light-source coherent transceiver, and the second clock output end of the clock signal distribution circuit is connected to a clock input end of the second single-light-source coherent transceiver. This solution can improve scalability of the single-fiber bidirectional optical transmission apparatus.

In a possible design, the single-fiber bidirectional optical transmission apparatus further includes the first multiplexer/demultiplexer and the second multiplexer/demultiplexer. For a technical effect of this design, refer to the first aspect. Details are not described herein again. In another possible design, the single-fiber bidirectional optical transmission apparatus is connected to the first multiplexer/demultiplexer and the second multiplexer/demultiplexer. For a technical effect of this design, refer to the first aspect. Details are not described herein again.

In a possible design, the single-fiber bidirectional optical transmission apparatus further includes the second client signal processing apparatus and the first client signal processing apparatus. In another possible design, the single-fiber bidirectional optical transmission apparatus is connected to the second client signal processing apparatus and the first client signal processing apparatus.

According to a third aspect, a wavelength division multiplexing device is provided. The wavelength division multiplexing device includes the single-fiber bidirectional optical transmission apparatus described in the first aspect or the second aspect. Because the wavelength division multiplexing device provided in this embodiment of this application includes the single-fiber bidirectional optical transmission apparatus described in the foregoing technical solution, the wavelength division multiplexing device provided in this embodiment of this application achieves the same expected effect as the single-fiber bidirectional optical transmission apparatus described in the first aspect or the second aspect, and details are not described again.

According to a fourth aspect, an optical transmission system is provided. The optical transmission system includes one or more first wavelength division multiplexing devices, and the first wavelength division multiplexing device includes the single-fiber bidirectional optical transmission apparatus described in the first aspect or the second aspect. Because the first wavelength division multiplexing device in the optical transmission system provided in this embodiment of this application includes the single-fiber bidirectional optical transmission apparatus described in the foregoing technical solution, the optical transmission system provided in this embodiment of this application achieves the same expected effect as the single-fiber bidirectional optical transmission apparatus described in the first aspect or the second aspect, and details are not described again.

In a possible design, the optical transmission system further includes a second wavelength division multiplexing device, and the second wavelength division multiplexing device includes a dual-light-source coherent optical transceiver. The dual-light-source coherent optical transceiver is configured to receive an optical signal (for example, the second optical signal or the fourth optical signal in the first aspect, or the first optical signal or the third optical signal in the second aspect) from the first wavelength division multiplexing device, and send an optical signal (for example, the first optical signal or the third optical signal in the first aspect, or the second optical signal or the fourth optical signal in the second aspect) to the first wavelength division multiplexing device. Therefore, the optical transmission system provided in this embodiment of this application may use a dual-light-source coherent optical transceiver commonly used in the industry, and has stronger compatibility.

DETAILED DESCRIPTION OF ILLUSTRATIVE EMBODIMENTS

For ease of understanding solutions in embodiments of this application, the following first briefly describes related technologies.

Figure 4:
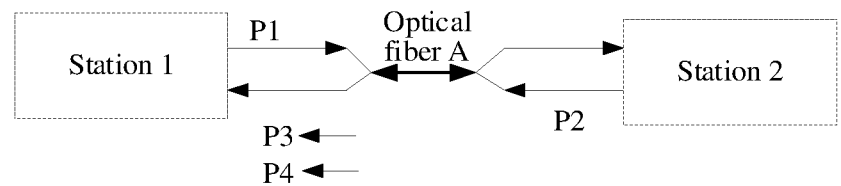
FIG. 4 is a schematic diagram of single-fiber bidirectional transmission.

1. Verify that two wavelengths in "single-fiber bidirectional" are necessarily two wavelengths allowed to be simultaneously transmitted in an optical fiber As shown in FIG. 4, assuming that two wavelengths in "single-fiber bidirectional" are the same, a crosstalk signal at an optical module end of a station 1 is an optical signal that arrives at a receive end of the optical module of the station 1 and that is obtained after a transmit-end optical signal of the optical module of the station 1 passes through a multiplexer/demultiplexer with an insertion loss (for example, the insertion loss is Satt=3.5 dB), and then enters an end surface of a long fiber (i.e., Optical fiber A) and is maximally reflected (R=14 dB), and a reflected signal further passes through a multiplexer/demultiplexer with an insertion loss (for example, Satt=3.5 dB). Assuming that power of the transmit-end optical signal of the optical module of the station 1 is P1, and crosstalk power at the optical module end of the station 1 is P3, P3=P1−3.5 dB−14 dB−3.5 dB=P1−21 dB.

A receive-end optical signal of the optical module of the station 1 is an optical signal that arrives at the receive end of the optical module of the station 1 and that is obtained after a transmit-end optical signal of an optical module of a station 2 passes through a multiplexer/demultiplexer with an insertion loss (Satt=3.5 dB), and then enters the long fiber and is transmitted (an insertion loss caused by the optical fiber A is ATT), and after passing through the long fiber, the signal further passes through a multiplexer/demultiplexer with an insertion loss (Satt=3.5 dB). Assuming that power of the transmit-end optical signal of the optical module of the station 2 is P2, and receive-end signal power of the optical module of the station 1 is P4, P4=P2−3.5−ATT−3.5=P2−7−ATT.

When two wavelengths in "single-fiber bidirectional" are the same, P1=P2. Then, a signal-to-noise ratio (signal-to-noise ratio, SNR) of the signal of the optical module of the station 1 is SNR=P4−P3=14 dB−ATT. Considering that ATT is greater than or equal to 0 dB, SNR 14 dB may be obtained. In a conventional technology, considering factors such as aging and a link system margin, services of 10G, 100G, and more than 100G require an SNR to be greater than 15 dB for long-time running. In this way, the signal-to-noise ratio of the signal of the optical module of the station 1 is obviously less than the SNR of long-term running. Consequently, an optical signal sent by the station 1 cannot be normally transmitted to the station 2. Similarly, a signal-to-noise ratio of the signal of the optical module of the station 2 is also less than the SNR of long-term running. Consequently, an optical signal sent by the station 2 cannot be normally transmitted to the station 1. In conclusion, it can be learned that two wavelengths in "single-fiber bidirectional" are necessarily two wavelengths allowed to be simultaneously transmitted in an optical fiber.

2. Signal Distribution Circuit

Figure 5:
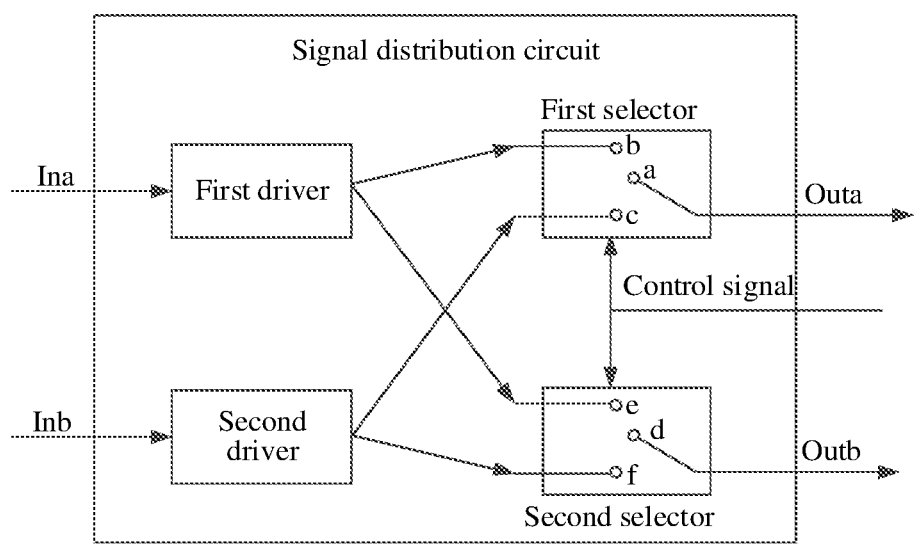
FIG. 5 is a schematic diagram of a structure of a possible signal distribution circuit according to an embodiment of this application.

FIG. 5 is a schematic diagram of a structure of a possible signal distribution circuit according to an embodiment of this application. As shown in FIG. 5, the signal distribution circuit includes a first driver, a second driver, a first selector, and a second selector. The first selector and the second selector may be implemented by using a single-pole double-throw switch. An input of the first driver is Ina, an input of the second driver is Inb, an output of the first selector is Outa, and an output of the second selector is Outb. The signal distribution circuit may implement four working states under an action of a control signal. The following briefly describes the four working states.

Figure 6A:
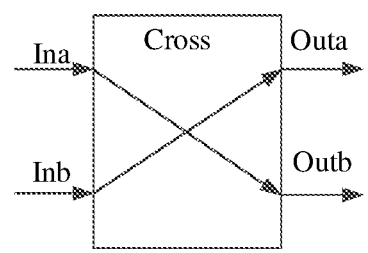
FIG. 6A shows a working state 1 of a signal distribution circuit according to an embodiment of this application.

State 1: When a contact a of the single-pole double-throw switch of the first selector overlaps a contact c, and a contact d of the single-pole double-throw switch of the second selector overlaps a contact e, a working state of the signal distribution circuit is shown in FIG. 6A. A signal input by using Ina is output from Outb, and a signal input by using Inb is output from Outa, thereby implementing cross transmission of signals.

Figure 6B:
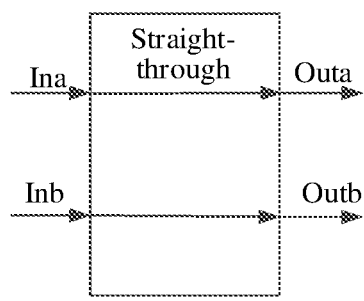
FIG. 6B shows a working state 2 of a signal distribution circuit according to an embodiment of this application.

State 2: When the contact a of the single-pole double-throw switch of the first selector overlaps with a contact b, and the contact d of the single-pole double-throw switch of the second selector overlaps with a contact f, a working state of the signal distribution circuit is shown in FIG. 6B. A signal input by using Ina is output from Outa, and a signal input by using Inb is output from Outb, thereby implementing straight-through transmission of signals.

Figure 6C:
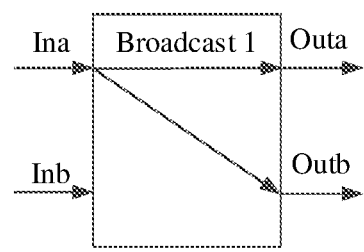
FIG. 6C shows a working state 3 of a signal distribution circuit according to an embodiment of this application.

State 3: When the contact a of the single-pole double-throw switch of the first selector overlaps the contact b, and the contact d of the single-pole double-throw switch of the second selector overlaps the contact e, a working state of the signal distribution circuit is shown in FIG. 6C. A signal input by using Ina is output from Outa and Outb, thereby implementing signal broadcasting.

Figure 6D:
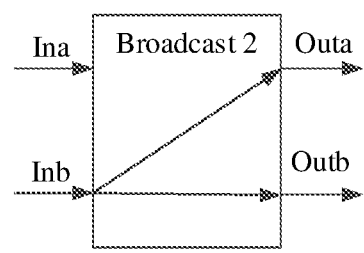
FIG. 6D shows a working state 4 of a signal distribution circuit according to an embodiment of this application.

State 4: When the contact a of the single-pole double-throw switch of the first selector overlaps the contact c, and the contact d of the single-pole double-throw switch of the second selector overlaps the contact f, a working state of the signal distribution circuit is shown in FIG. 6D. A signal input by using Inb is output from Outa and Outb, thereby implementing signal broadcasting.

The following describes technical solutions in embodiments of this application with reference to accompanying drawings in embodiments of this application. In descriptions of this application, unless otherwise specified, "/" indicates that associated objects are in an "or" relationship. For example, A/B may represent A or B. In this application, "and/or" is merely an association relationship for describing associated objects and represents that three relationships may exist. For example, A and/or B may represent the following three cases: Only A exists, both A and B exist, and only B exists. In addition, in descriptions of this application, unless otherwise specified, "a plurality of" means two or more than two. The expression "at least one of the following items (pieces)" or a similar expression means any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, to clearly describe technical solutions in embodiments of this application, words such as "first" and "second" are used in embodiments of this application to distinguish between same items or similar items that provide basically same functions or effects. A person skilled in the art may understand that the words such as "first" and "second" do not limit a quantity or an execution sequence, and the words such as "first" and "second" do not indicate a definite difference. In addition, in embodiments of this application, the word such as "example" or "for example" is used to represent giving an example, an illustration, or a description. Any embodiment or design scheme described as "example" or "for example" in embodiments of this application should not be explained as being more preferred or having more advantages than another embodiment or design scheme. Exactly, use of the word such as "example" or "for example" is intended to present a relative concept in a specific manner for ease of understanding.

Figure 1:
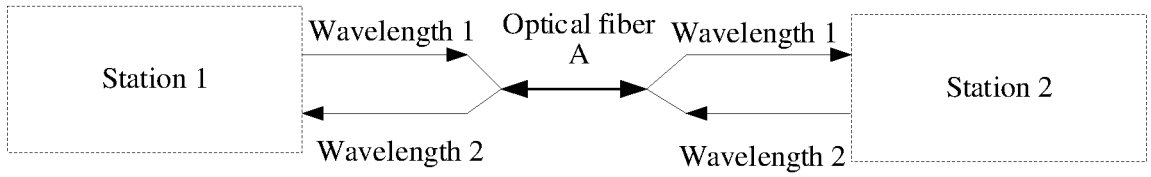
FIG. 1 is a schematic diagram of an existing single-fiber bidirectional application scenario.
Figure 2:
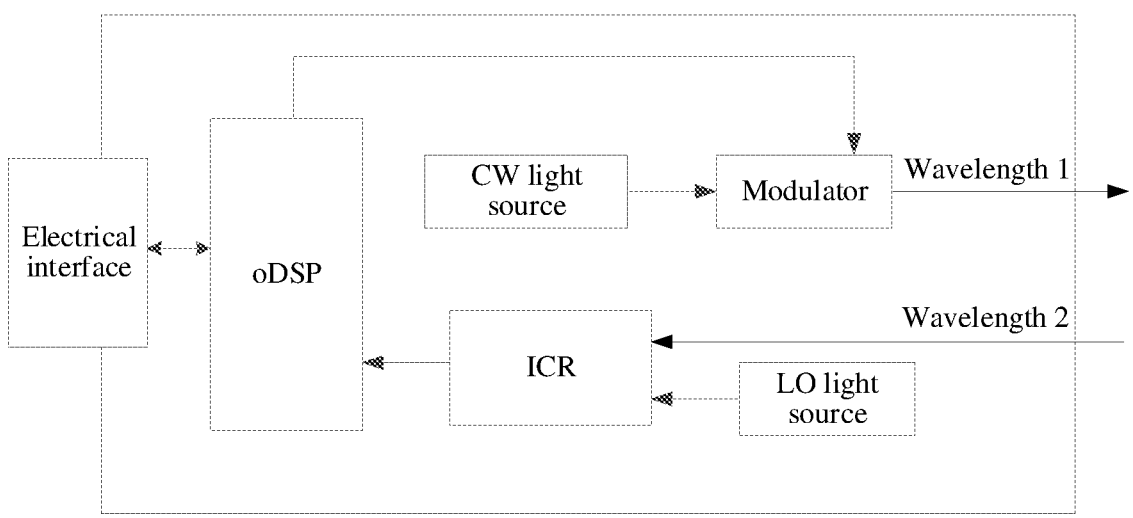
FIG. 2 is a schematic diagram of a structure of an existing dual-light-source coherent optical transceiver.
Figure 3:
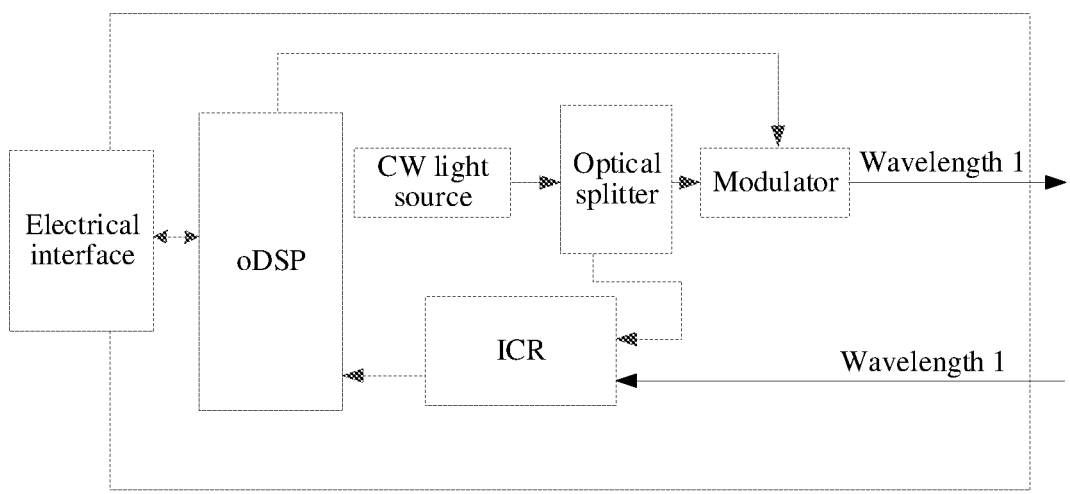
FIG. 3 is a schematic diagram of a structure of an existing miniaturized single-light-source coherent optical transceiver.
Figure 7:
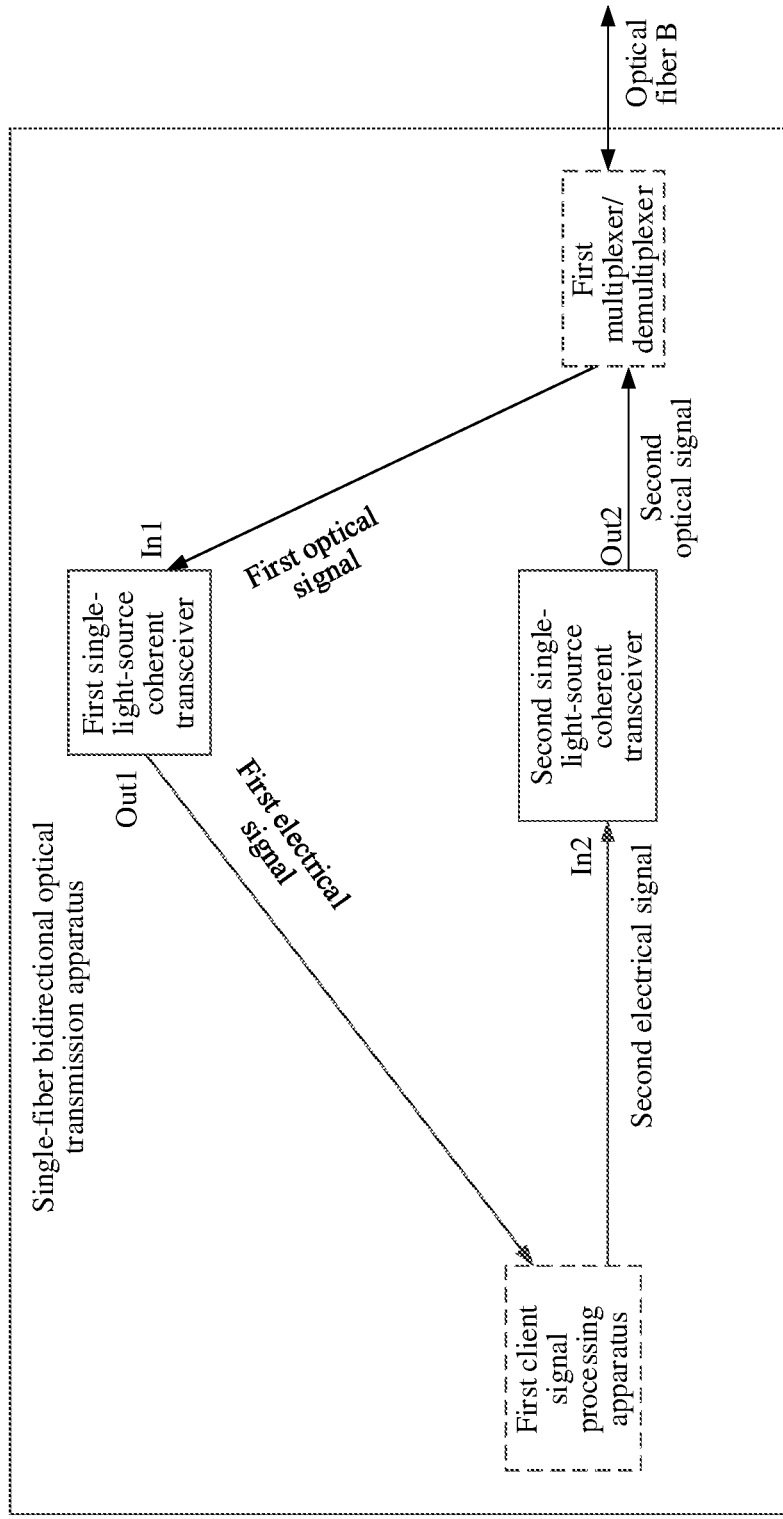
FIG. 7 is a schematic diagram 1 of a structure of a single-fiber bidirectional optical transmission apparatus according to an embodiment of this application.

FIG. 7 is a schematic diagram of a structure of a single-fiber bidirectional optical transmission apparatus according to an embodiment of this application. The single-fiber bidirectional optical transmission apparatus includes a first single-light-source coherent optical transceiver and a second single-light-source coherent optical transceiver. For schematic diagrams of structures of the first single-light-source coherent optical transceiver and the second single-light-source coherent optical transceiver, refer to FIG. 3. Details are not described herein again.

The first single-light-source coherent optical transceiver is configured to: receive a first optical signal from a first multiplexer/demultiplexer by using an optical input end (for example, In1 in FIG. 7), convert the first optical signal into a first electrical signal, and send the first electrical signal to a first client signal processing apparatus by using an electrical output end (for example, Out1 in FIG. 7). The second single-light-source coherent optical transceiver is configured to: receive a second electrical signal from the first client signal processing apparatus by using an electrical input end (for example, In2 in FIG. 7), convert the second electrical signal into a second optical signal, and send the second optical signal to the first multiplexer/demultiplexer by using an optical output end (for example, Out2 in FIG. 7). A wavelength of the second optical signal is different from a wavelength of the first optical signal. Different from a solution in a conventional technology in which single-fiber bidirectional optical transmission is implemented by using a dual-light-source coherent optical transceiver, the single-fiber bidirectional optical transmission apparatus in this embodiment of this application includes two single-light-source coherent optical transceivers. As the second single-light-source coherent optical transceiver sends the second optical signal to the first multiplexer/demultiplexer, and the first single-light-source coherent optical transceiver receives the first optical signal from the first multiplexer/demultiplexer, it can be learned that the optical output end of the second single-light-source coherent optical transceiver and the optical input end of the first single-light-source coherent optical transceiver are connected to a transceiver port of a same single-fiber bidirectional multiplexer/demultiplexer. In addition, as the second single-light-source coherent optical transceiver receives the second electrical signal from the first client signal processing apparatus, and the first single-light-source coherent optical transceiver sends the first electrical signal to the first client signal processing apparatus, it can be learned that the electrical input end of the second single-light-source coherent optical transceiver and the electrical output end of the first single-light-source coherent optical transceiver are connected to a same client signal processing apparatus. In addition, because wavelengths of optical signals of the first single-light-source coherent optical transceiver and the second single-light-source coherent optical transceiver are different, it is equivalent to obtaining a virtual dual-light-source module. Therefore, the single-fiber bidirectional optical transmission apparatus can implement one channel of single-fiber bidirectional optical transmission. In conclusion, in this embodiment of this application, one channel of single-fiber bidirectional optical transmission may be implemented by using miniaturized single-light-source coherent optical transceivers.

In this embodiment of this application, the first multiplexer/demultiplexer may be deployed in the single-fiber bidirectional optical transmission apparatus shown in FIG. 7, or may be deployed outside the single-fiber bidirectional optical transmission apparatus shown in FIG. 7 (that is, the single-fiber bidirectional optical transmission apparatus is connected to the first multiplexer/demultiplexer). This is not specifically limited in this embodiment of this application. When the single-fiber bidirectional optical transmission apparatus includes the first multiplexer/demultiplexer, there is only one optical port in a direction from the first client signal processing apparatus to the first multiplexer/demultiplexer, and the optical port allows transmission of optical signals in two directions. This solution features convenient fiber connection and no need to configure a fiber connection manner.

When the first multiplexer/demultiplexer is deployed outside the single-fiber bidirectional optical transmission apparatus, in a direction from the first client signal processing apparatus to the first multiplexer/demultiplexer, the single-fiber bidirectional optical transmission apparatus needs two optical ports, one optical port is configured to input an optical signal, and the other optical port is configured to output an optical signal. This solution features subsequent compatibility with an existing function of implementing dual-fiber bidirectional optical transmission by using single-light-source coherent optical transceivers, and more flexibility.

For example, the multiplexer/demultiplexer (including the first multiplexer/demultiplexer and the second multiplexer/demultiplexer mentioned in this application) in this embodiment of this application includes but is not limited to a thin-film filter, a band-splitting filter, a wavelength selective switch (WSS), an arrayed waveguide grating (arrayed waveguide grating, AWG), or the like.

In this embodiment of this application, the first client signal processing apparatus may be deployed in the single-fiber bidirectional optical transmission apparatus shown in FIG. 7, or may be deployed outside the single-fiber bidirectional optical transmission apparatus shown in FIG. 7 (that is, the single-fiber bidirectional optical transmission apparatus is connected to the first client signal processing apparatus). This is not specifically limited in this embodiment of this application.

In this embodiment of this application, the first single-light-source coherent optical transceiver and/or the second single-light-source coherent optical transceiver may be an unpluggable module, or may be a pluggable module. This is not specifically limited in this embodiment of this application.

Figure 8:
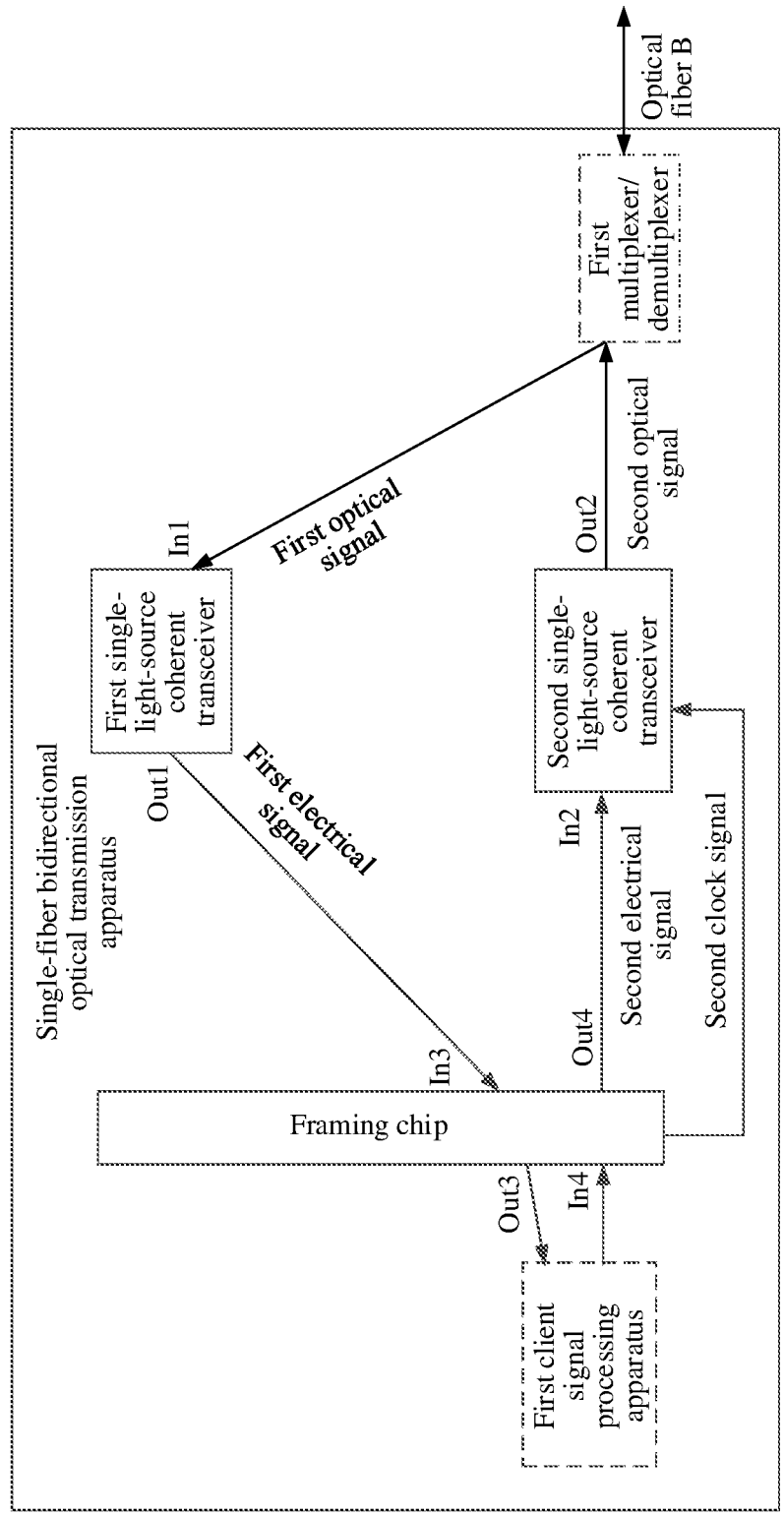
FIG. 8 is a schematic diagram 2 of a structure of a single-fiber bidirectional optical transmission apparatus according to an embodiment of this application.

In addition, in this embodiment of this application, when the second single-light-source coherent optical transceiver converts the second electrical signal into the second optical signal, the second electrical signal needs to cooperate with a second clock signal to generate the second optical signal. In a possible implementation, in the single-fiber bidirectional optical transmission apparatus shown in FIG. 7, a working mode of the second single-light-source coherent optical transceiver needs to be set to a self-recovery clock mode, so that the second single-light-source coherent optical transceiver generates the second clock signal. In another possible implementation, as shown in FIG. 8, the single-fiber bidirectional optical transmission apparatus provided in this embodiment of this application may further include a framing (FRAMER) chip. The framing chip is configured to provide the second clock signal to the second single-light-source coherent transceiver. The second clock signal is extracted by the framing chip from an unprocessed second electrical signal received from the first client signal processing apparatus. This solution can ensure that a transmit-end optical signal and a client-side signal have a same clock source, thereby ensuring that a service of the single-fiber bidirectional optical transmission apparatus is normal.

In addition, in this embodiment of this application, the framing chip is further configured to implement conversion between a client-side electrical signal and a line-side electrical signal. Specifically, as shown in FIG. 8, the framing chip is further configured to receive the first electrical signal from the first single-light-source coherent optical transceiver by using a first electrical input end (for example, In3 in FIG. 8), and send a processed first electrical signal to the first client signal processing apparatus by using a first electrical output end (for example, Out3 in FIG. 8). The framing chip is further configured to receive the unprocessed second electrical signal from the first client signal processing apparatus by using a second electrical input end (for example, In4 in FIG. 8), and send the second electrical signal to the second single-light-source coherent transceiver by using a second electrical output end (for example, Out4 in FIG. 8).

Figure 9:
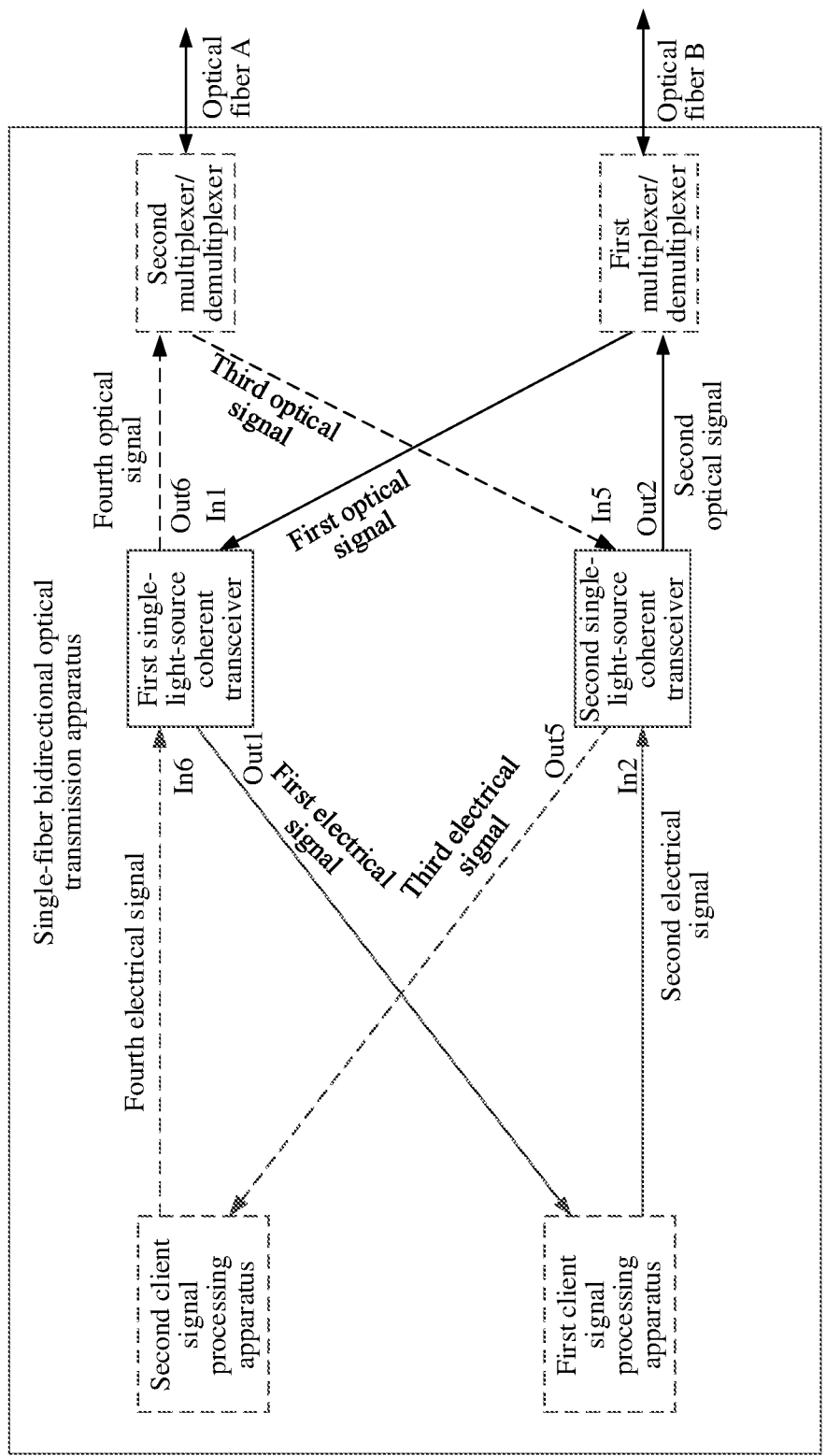
FIG. 9 is a schematic diagram 3 of a structure of a single-fiber bidirectional optical transmission apparatus according to an embodiment of this application.

Based on the single-fiber bidirectional optical transmission apparatus shown in FIG. 7, further, as shown in FIG. 9, the second single-light-source coherent optical transceiver is further configured to: receive a third optical signal from a second multiplexer/demultiplexer by using an optical input end (for example, In5 in FIG. 9), convert the third optical signal into a third electrical signal, and send the third electrical signal to a second client signal processing apparatus by using an electrical output end (for example, Out5 in FIG. 9). A wavelength of the third optical signal is the same as the wavelength of the second optical signal, but the optical signals are in opposite directions. The first single-light-source coherent optical transceiver is further configured to: receive a fourth electrical signal from the second client signal processing apparatus by using an electrical input end (for example, In6 in FIG. 9), convert the fourth electrical signal into a fourth optical signal, and send the fourth optical signal to the second multiplexer/demultiplexer by using an optical output end (for example, Out6 in FIG. 9). A wavelength of the fourth optical signal is the same as the wavelength of the first optical signal, but the optical signals are in opposite directions. In this solution, as the first single-light-source coherent optical transceiver sends the fourth optical signal to the second multiplexer/demultiplexer, and the second single-light-source coherent optical transceiver receives the third optical signal from the second multiplexer/demultiplexer, it can be learned that the optical input end of the second single-light-source coherent optical transceiver and the optical output end of the first single-light-source coherent optical transceiver are connected to a transceiver port of a same single-fiber bidirectional multiplexer/demultiplexer. In addition, as the first single-light-source coherent optical transceiver receives the fourth electrical signal from the second client signal processing apparatus, and the second single-light-source coherent optical transceiver sends the third electrical signal to the second client signal processing apparatus, it can be learned that the electrical output end of the second single-light-source coherent optical transceiver and the electrical input end of the first single-light-source coherent optical transceiver are connected to a same client signal processing apparatus. In addition, because wavelengths of optical signals of the first single-light-source coherent optical transceiver and the second single-light-source coherent optical transceiver are different, it is equivalent to first obtaining one virtual dual-light-source module in the single-fiber bidirectional optical transmission apparatus shown in FIG. 7 and then obtaining another virtual dual-light-source module with paired wavelengths. Therefore, the single-fiber bidirectional optical transmission apparatus can implement two channels of single-fiber bidirectional optical transmission. In conclusion, in this embodiment of this application, two channels of single-fiber bidirectional optical transmission may be implemented by using miniaturized single-light-source coherent optical transceivers.

It should be noted that wavelength combinations of the two virtual dual-light-source modules obtained in the single-fiber bidirectional optical transmission apparatus shown in FIG. 9 are exactly opposite. For example, it is assumed that an optical signal of the first single-light-source coherent optical transceiver uses a second wavelength, and an optical signal of the second single-light-source coherent optical transceiver uses a fourth wavelength. Then, one virtual dual-light-source module (a solid-line loop in FIG. 9) obtained in the single-fiber bidirectional optical transmission apparatus shown in FIG. 9 uses the second wavelength for receiving, and uses the fourth wavelength for sending. The other virtual dual-light-source module (a dashed-line loop in FIG. 9) obtained in the single-fiber bidirectional optical transmission apparatus shown in FIG. 9 uses the fourth wavelength for receiving, and uses the second wavelength for sending.

In this embodiment of this application, the second multiplexer/demultiplexer may be deployed in the single-fiber bidirectional optical transmission apparatus shown in FIG. 9, or may be deployed outside the single-fiber bidirectional optical transmission apparatus shown in FIG. 9 (that is, the single-fiber bidirectional optical transmission apparatus is connected to the second multiplexer/demultiplexer). This is not specifically limited in this embodiment of this application. When the single-fiber bidirectional optical transmission apparatus includes the second multiplexer/demultiplexer, there is only one optical port in a direction from the second client signal processing apparatus to the second multiplexer/demultiplexer, and the optical port allows transmission of optical signals in two directions. This solution features convenient fiber connection and no need to configure a fiber connection manner. When the second multiplexer/demultiplexer is deployed outside the single-fiber bidirectional optical transmission apparatus, in a direction from the second client signal processing apparatus to the second multiplexer/demultiplexer, the single-fiber bidirectional optical transmission apparatus needs two optical ports, one optical port is configured to input an optical signal, and the other optical port is configured to output an optical signal. This solution features subsequent compatibility with an existing function of implementing dual-fiber bidirectional optical transmission by using single-light-source coherent optical transceivers, and more flexibility.

It should be understood that, when the single-fiber bidirectional optical transmission apparatus shown in FIG. 9 includes the second multiplexer/demultiplexer and the first multiplexer/demultiplexer, both cross transmission of electrical signals and cross transmission of optical signals in FIG. 9 are implemented in the single-fiber bidirectional optical transmission apparatus. When the second multiplexer/demultiplexer and the first multiplexer/demultiplexer are deployed outside the single-fiber bidirectional optical transmission apparatus shown in FIG. 9, cross transmission of electrical signals in FIG. 9 is implemented in the single-fiber bidirectional optical transmission apparatus, and cross transmission of optical signals is implemented outside the single-fiber bidirectional optical transmission apparatus. This is uniformly described herein, and details are not described below again.

In this embodiment of this application, the second client signal processing apparatus may be deployed in the single-fiber bidirectional optical transmission apparatus shown in FIG. 9, or may be deployed outside the single-fiber bidirectional optical transmission apparatus shown in FIG. 9 (that is, the single-fiber bidirectional optical transmission apparatus is connected to the second client signal processing apparatus). This is not specifically limited in this embodiment of this application.

Figure 10:
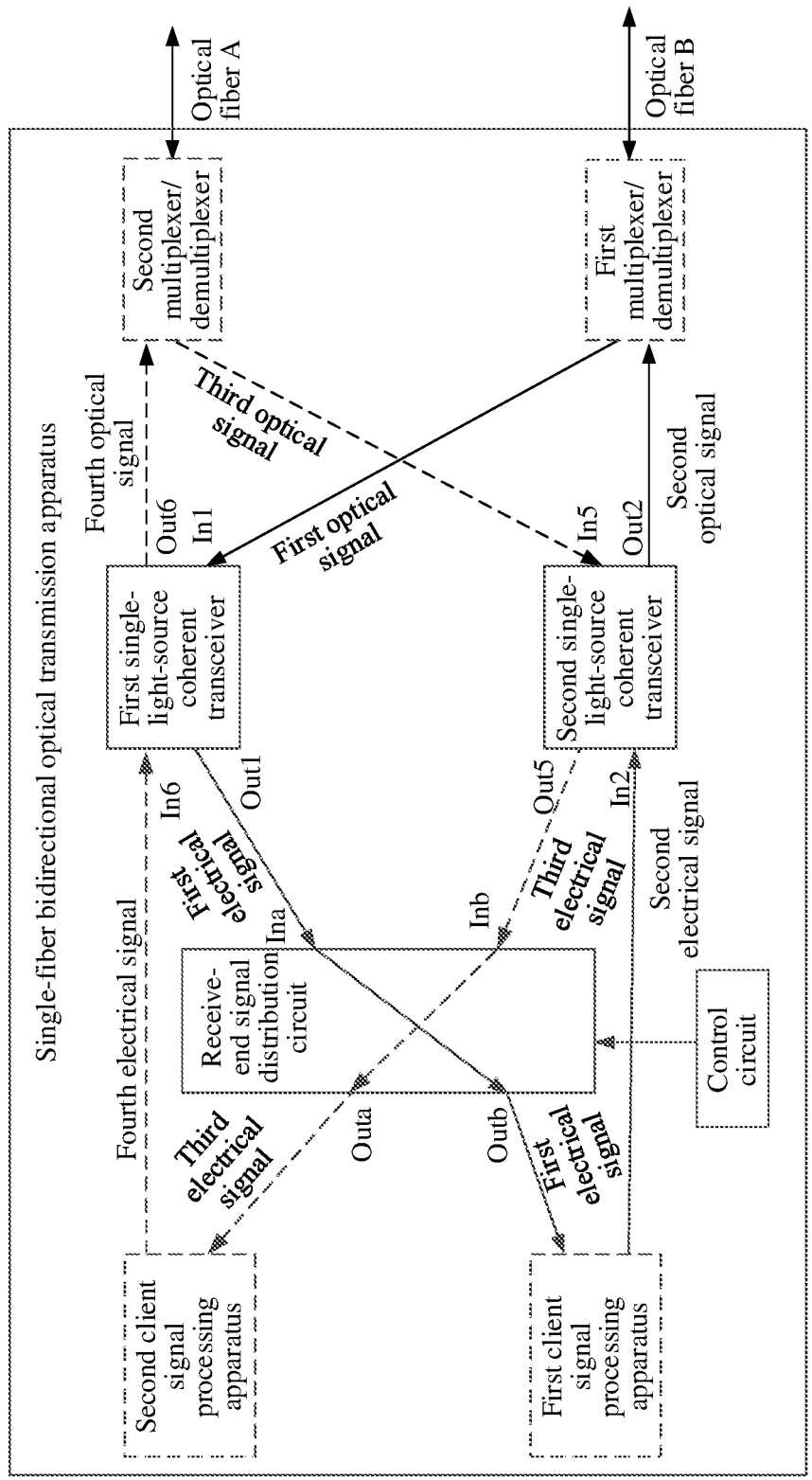
FIG. 10 is a schematic diagram 4 of a structure of a single-fiber bidirectional optical transmission apparatus according to an embodiment of this application.

Based on the single-fiber bidirectional optical transmission apparatus shown in FIG. 9, optionally, to improve scalability of the single-fiber bidirectional optical transmission apparatus, as shown in FIG. 10, the single-fiber bidirectional optical transmission apparatus further includes a receive-end signal distribution circuit and a control circuit. For a schematic diagram of a structure of the receive-end signal distribution circuit, refer to the signal distribution circuit shown in FIG. 5. Details are not described herein again. The receive-end signal distribution circuit is configured to: receive the first electrical signal from the first single-light-source coherent optical transceiver by using a first electrical input end (for example, Ina in FIG. 10), and receive the third electrical signal from the second single-light-source coherent optical transceiver by using a second electrical input end (for example, Inb in FIG. 10). The control circuit is configured to control the receive-end signal distribution circuit to output the first electrical signal from a first electrical output end (for example, Outb in FIG. 10) of the receive-end signal distribution circuit, and control the receive-end signal distribution circuit to output the third electrical signal from a second electrical output end (for example, Outa in FIG. 10) of the receive-end signal distribution circuit. The first electrical output end of the receive-end signal distribution circuit is connected to the electrical input end of the first client signal processing apparatus, and the second electrical output end of the receive-end signal distribution circuit is connected to the electrical input end of the second client signal processing apparatus. In other words, in this embodiment of this application, the control circuit controls the receive-end signal distribution circuit to work in the state shown in FIG. 6A, to implement a function of crossing, to the first client signal processing apparatus, the first electrical signal output by the first single-light-source coherent transceiver, and implement a function of crossing, to the second client signal processing apparatus, the third electrical signal output by the second single-light-source coherent transceiver. Certainly, the control circuit may alternatively control the receive-end signal distribution circuit to work in the state shown in FIG. 6B, to be compatible with the existing function of implementing dual-fiber bidirectional optical transmission by using single-light-source coherent optical transceivers. This is not specifically limited in this embodiment of this application. For the existing function of implementing dual-fiber bidirectional optical transmission by using single-light-source coherent optical transceivers, refer to a conventional technology. Details are not described herein. Optionally, the control circuit may alternatively control the receive-end signal distribution circuit to work in the state shown in FIG. 6C or FIG. 6D. This is not specifically limited in this embodiment of this application.

In addition, in this embodiment of this application, when the second single-light-source coherent optical transceiver converts the second electrical signal into the second optical signal, the second electrical signal needs to cooperate with a second clock signal to generate the second optical signal. When the first single-light-source coherent optical transceiver converts the fourth electrical signal into the fourth optical signal, the fourth electrical signal needs to cooperate with a first clock signal to generate the fourth optical signal.

Figure 11:
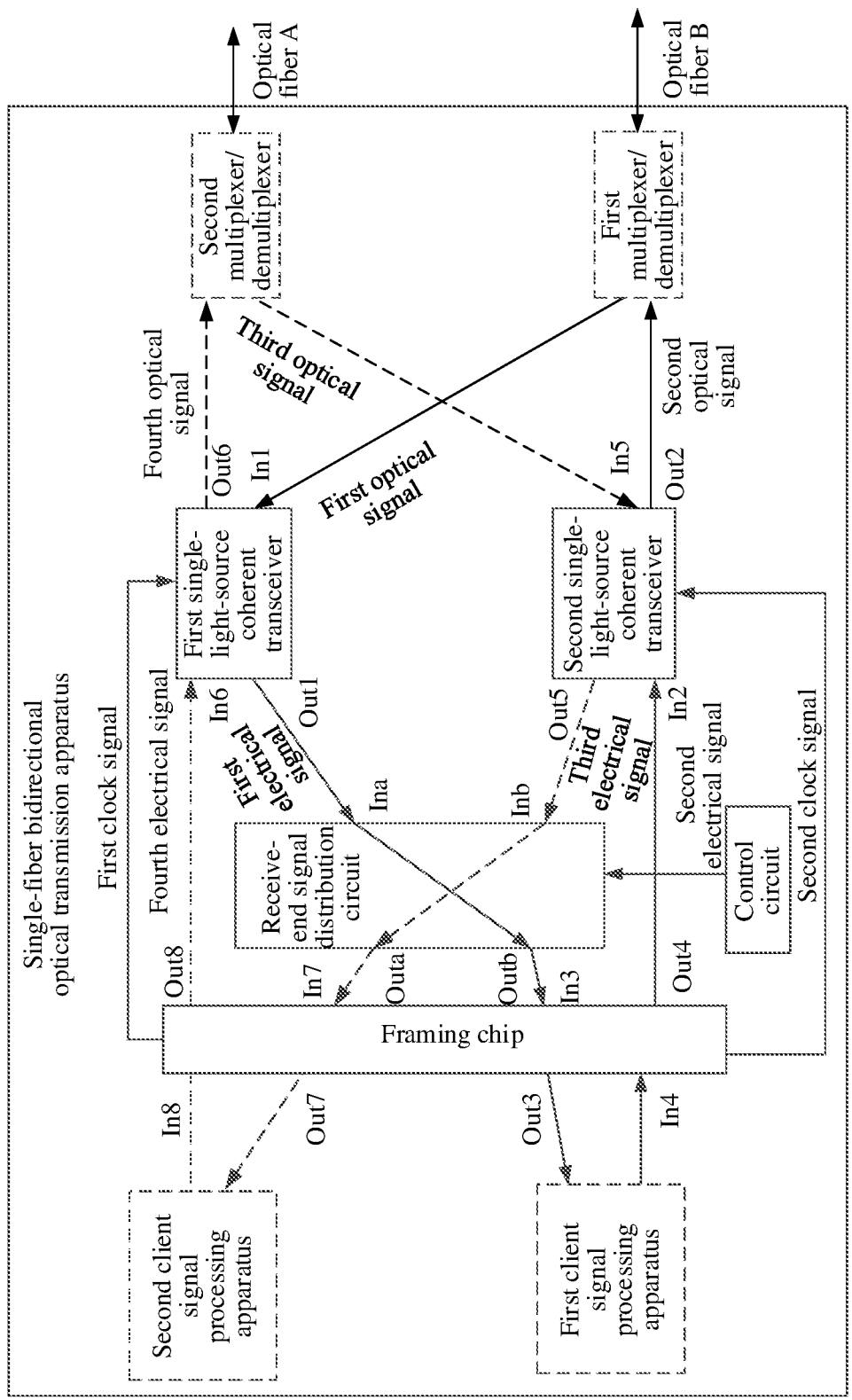
FIG. 11 is a schematic diagram 5 of a structure of a single-fiber bidirectional optical transmission apparatus according to an embodiment of this application.

In a possible implementation, in the single-fiber bidirectional optical transmission apparatus shown in FIG. 9 or FIG. 10, a working mode of the first single-light-source coherent optical transceiver and a working mode of the second single-light-source coherent optical transceiver need to be set to a self-recovery clock mode, so that the first single-light-source coherent optical transceiver generates the first clock signal and the second single-light-source coherent optical transceiver generates the second clock signal. In another possible implementation, based on the single-fiber bidirectional optical transmission apparatus shown in FIG. 9 or FIG. 10, the single-fiber bidirectional optical transmission apparatus provided in this embodiment of this application may further include a framing chip. The single-fiber bidirectional optical transmission apparatus shown in FIG. 10 is used as an example. As shown in FIG. 11, the framing chip is configured to provide the first clock signal to the first single-light-source coherent transceiver, and provide the second clock signal to the second single-light-source coherent transceiver. The first clock signal is extracted by the framing chip from an unprocessed fourth electrical signal received from the second client signal processing apparatus, and the second clock signal is extracted by the framing chip from an unprocessed second electrical signal received from the first client signal processing apparatus. This solution can ensure that a transmit-end optical signal and a client-side signal have a same clock source, thereby ensuring that a service of the single-fiber bidirectional optical transmission apparatus is normal.

In addition, in this embodiment of this application, the framing chip is further configured to implement conversion between a client-side electrical signal and a line-side electrical signal. Specifically, as shown in FIG. 11, the framing chip is further configured to receive the first electrical signal from the receive-end signal distribution circuit by using a first electrical input end (for example, In3 in FIG. 11), and send a processed first electrical signal to the first client signal processing apparatus by using a first electrical output end (for example, Out3 in FIG. 11). The framing chip is further configured to receive the unprocessed second electrical signal from the first client signal processing apparatus by using a second electrical input end (for example, In4 in FIG. 11), and send the second electrical signal to the second single-light-source coherent transceiver by using a second electrical output end (for example, Out4 in FIG. 11). The framing chip is further configured to receive the third electrical signal from the receive-end signal distribution circuit by using a third electrical input end (for example, In7 in FIG. 11), and send a processed third electrical signal to the second client signal processing apparatus by using a third electrical output end (for example, Out7 in FIG. 11). The framing chip is further configured to receive the unprocessed fourth electrical signal from the second client signal processing apparatus by using a fourth electrical input end (for example, In8 in FIG. 11), and send the fourth electrical signal to the first single-light-source coherent transceiver by using a fourth electrical output end (for example, Out8 in FIG. 11).

Figure 12:
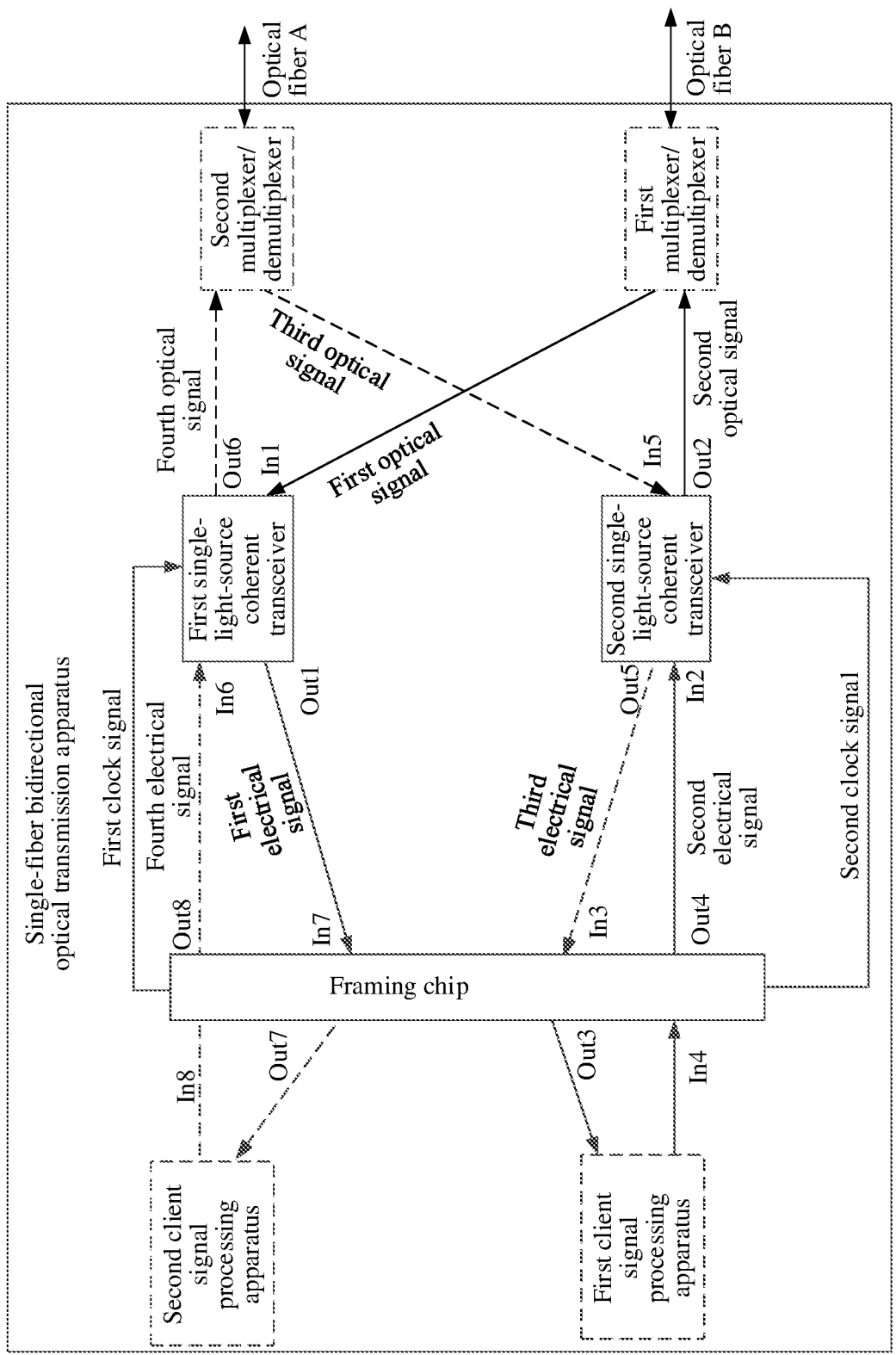
FIG. 12 is a schematic diagram 6 of a structure of a single-fiber bidirectional optical transmission apparatus according to an embodiment of this application.

Optionally, the receive-end signal distribution circuit and the control circuit that are shown in FIG. 11 may be integrated into the framing chip. In this case, a schematic diagram of a structure of a corresponding single-fiber bidirectional optical transmission apparatus may be shown in FIG. 12. The framing chip is configured to receive the first electrical signal from the first single-light-source coherent optical transceiver by using the third electrical input end (for example, In7 in FIG. 12), and send the processed first electrical signal to the first client signal processing apparatus by using the first electrical output end (for example, Out3 in FIG. 12). The framing chip is further configured to receive the unprocessed second electrical signal from the first client signal processing apparatus by using the second electrical input end (for example, In4 in FIG. 12), and send the second electrical signal to the second single-light-source coherent transceiver by using the second electrical output end (for example, Out4 in FIG. 12). The framing chip is further configured to receive the third electrical signal from the first single-light-source coherent optical transceiver by using the first electrical input end (for example, In3 in FIG. 12), and send the processed third electrical signal to the second client signal processing apparatus by using the third electrical output end (for example, Out7 in FIG. 12). The framing chip is further configured to receive the unprocessed fourth electrical signal from the second client signal processing apparatus by using the fourth electrical input end (for example, In8 in FIG. 12), and send the fourth electrical signal to the first single-light-source coherent optical transceiver by using the fourth electrical output end (for example, Out8 in FIG. 12). In addition, the framing chip is further configured to provide the first clock signal to the first single-light-source coherent transceiver, and provide the second clock signal to the second single-light-source coherent transceiver. Functions of the receive-end signal distribution circuit and the control circuit are implemented by the framing chip.

Figure 13:
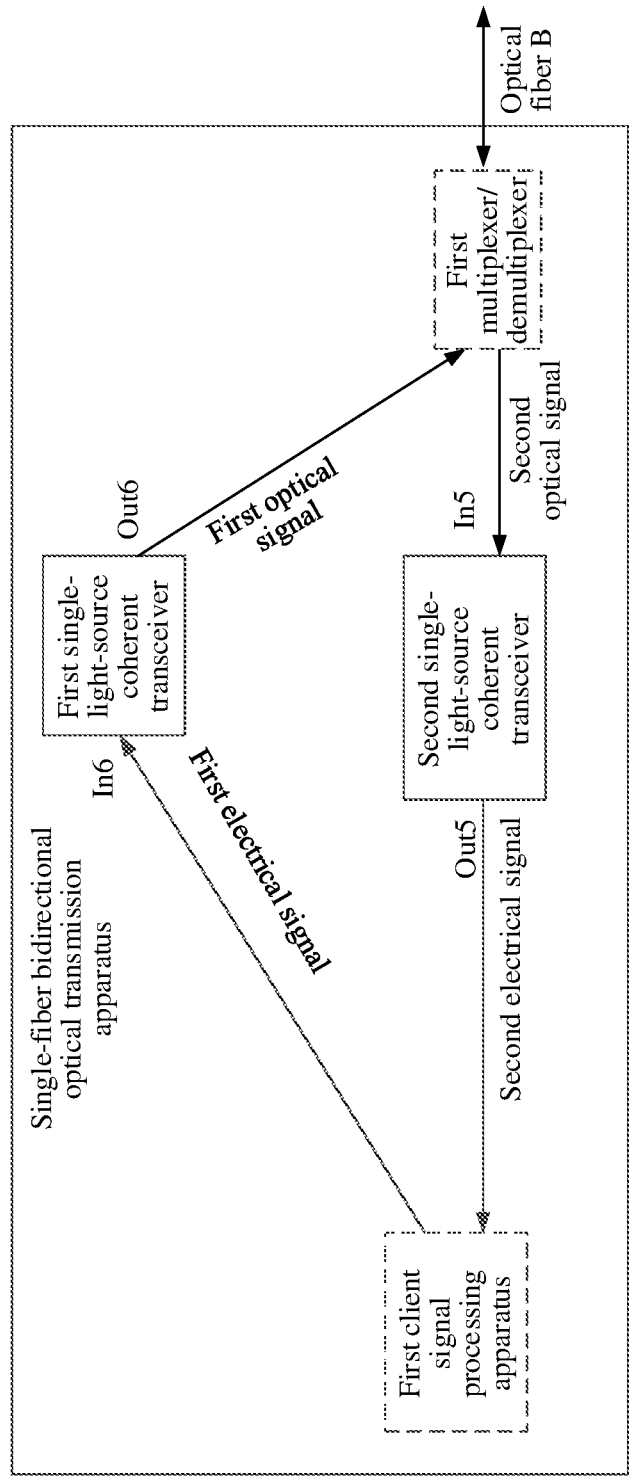
FIG. 13 is a schematic diagram 7 of a structure of a single-fiber bidirectional optical transmission apparatus according to an embodiment of this application.

FIG. 13 is a schematic diagram of a structure of another single-fiber bidirectional optical transmission apparatus according to an embodiment of this application. The single-fiber bidirectional optical transmission apparatus includes a first single-light-source coherent optical transceiver and a second single-light-source coherent optical transceiver. For schematic diagrams of structures of the first single-light-source coherent optical transceiver and the second single-light-source coherent optical transceiver, refer to FIG. 3. Details are not described herein again. The first single-light-source coherent transceiver is configured to: receive a first electrical signal from a first client signal processing apparatus by using an electrical input end (for example, In6 in FIG. 13), convert the first electrical signal into a first optical signal, and send the first optical signal to a first multiplexer/demultiplexer by using an optical output end (for example, Out6 in FIG. 13). The second single-light-source coherent transceiver is configured to: receive a second optical signal from the first multiplexer/demultiplexer by using an optical input end (for example, In5 in FIG. 13), convert the second optical signal into a second electrical signal, and send the second electrical signal to the first client signal processing apparatus by using an electrical output end (for example, Out5 in FIG. 13). A wavelength of the second optical signal is different from a wavelength of the first optical signal. Different from a solution in a conventional technology in which single-fiber bidirectional optical transmission is implemented by using a dual-light-source coherent optical transceiver, the single-fiber bidirectional optical transmission apparatus in this embodiment of this application includes two single-light-source coherent optical transceivers. As the first single-light-source coherent optical transceiver sends the first optical signal to the first multiplexer/demultiplexer, and the second single-light-source coherent optical transceiver receives the second optical signal from the first multiplexer/demultiplexer, it can be learned that the optical input end of the second single-light-source coherent optical transceiver and the optical output end of the first single-light-source coherent optical transceiver are connected to a transceiver port of a same single-fiber bidirectional multiplexer/demultiplexer. In addition, as the first single-light-source coherent optical transceiver receives the first electrical signal from the first client signal processing apparatus, and the second single-light-source coherent optical transceiver sends the second electrical signal to the first client signal processing apparatus, it can be learned that the electrical output end of the second single-light-source coherent optical transceiver and the electrical input end of the first single-light-source coherent optical transceiver are connected to a same client signal processing apparatus. In addition, because wavelengths of optical signals of the first single-light-source coherent optical transceiver and the second single-light-source coherent optical transceiver are different, it is equivalent to obtaining a virtual dual-light-source module. Therefore, the single-fiber bidirectional optical transmission apparatus can implement one channel of single-fiber bidirectional optical transmission. In conclusion, in this embodiment of this application, two channels of single-fiber bidirectional optical transmission may be implemented by using miniaturized single-light-source coherent optical transceivers.

In this embodiment of this application, for deployment location relationships of the first multiplexer/demultiplexer and the first client signal processing apparatus with the single-fiber bidirectional optical transmission apparatus, refer to the description in the embodiment shown in FIG. 7. Details are not described herein again. In this embodiment of this application, the first single-light-source coherent optical transceiver and/or the second single-light-source coherent optical transceiver may be an unpluggable module, or may be a pluggable module. This is not specifically limited in this embodiment of this application.

Figure 14:
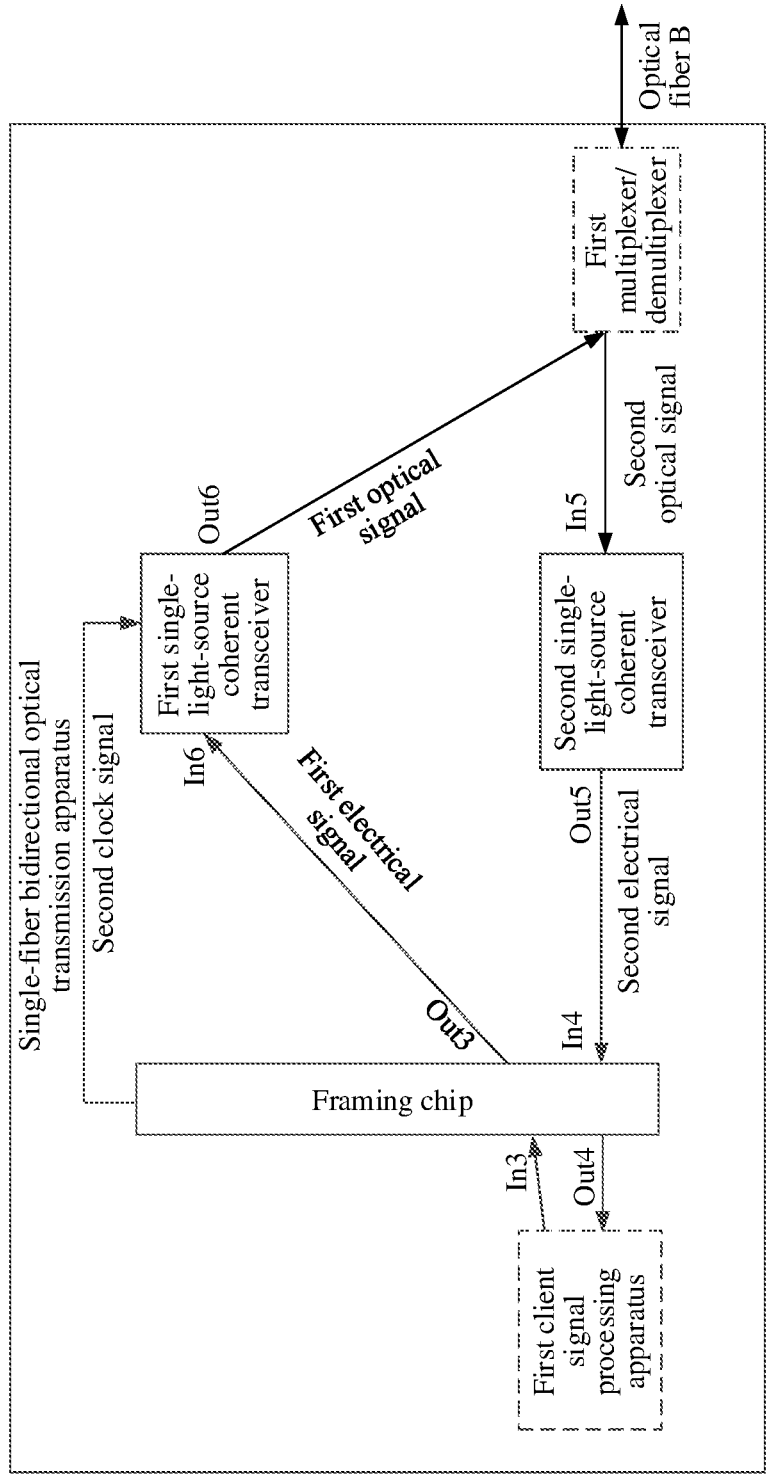
FIG. 14 is a schematic diagram 8 of a structure of a single-fiber bidirectional optical transmission apparatus according to an embodiment of this application.

In addition, in this embodiment of this application, when the first single-light-source coherent optical transceiver converts the first electrical signal into the first optical signal, the first electrical signal needs to cooperate with a second clock signal to generate the first optical signal. In a possible implementation, in the single-fiber bidirectional optical transmission apparatus shown in FIG. 13, a working mode of the first single-light-source coherent optical transceiver needs to be set to a self-recovery clock mode, so that the first single-light-source coherent optical transceiver generates the second clock signal. In another possible implementation, as shown in FIG. 14, the single-fiber bidirectional optical transmission apparatus provided in this embodiment of this application may further include a framing chip. The framing chip is configured to provide the second clock signal to the first single-light-source coherent transceiver. The second clock signal is extracted by the framing chip from an unprocessed first electrical signal received from the first client signal processing apparatus. This solution can ensure that a transmit-end optical signal and a client-side signal have a same clock source, thereby ensuring that a service of the single-fiber bidirectional optical transmission apparatus is normal.

In addition, in this embodiment of this application, the framing chip is further configured to implement conversion between a client-side electrical signal and a line-side electrical signal. Specifically, as shown in FIG. 14, the framing chip is further configured to receive the unprocessed first electrical signal from the first client signal processing apparatus by using a first electrical input end (for example, In3 in FIG. 14), and send the first electrical signal to the first single-light-source coherent transceiver by using a first electrical output end (for example, Out3 in FIG. 14). The framing chip is further configured to receive the second electrical signal from the second single-light-source coherent transceiver by using a second electrical input end (for example, In4 in FIG. 14), and send a processed second electrical signal to the first client signal processing apparatus by using a second electrical output end (for example, Out4 in FIG. 14).

Figure 15:
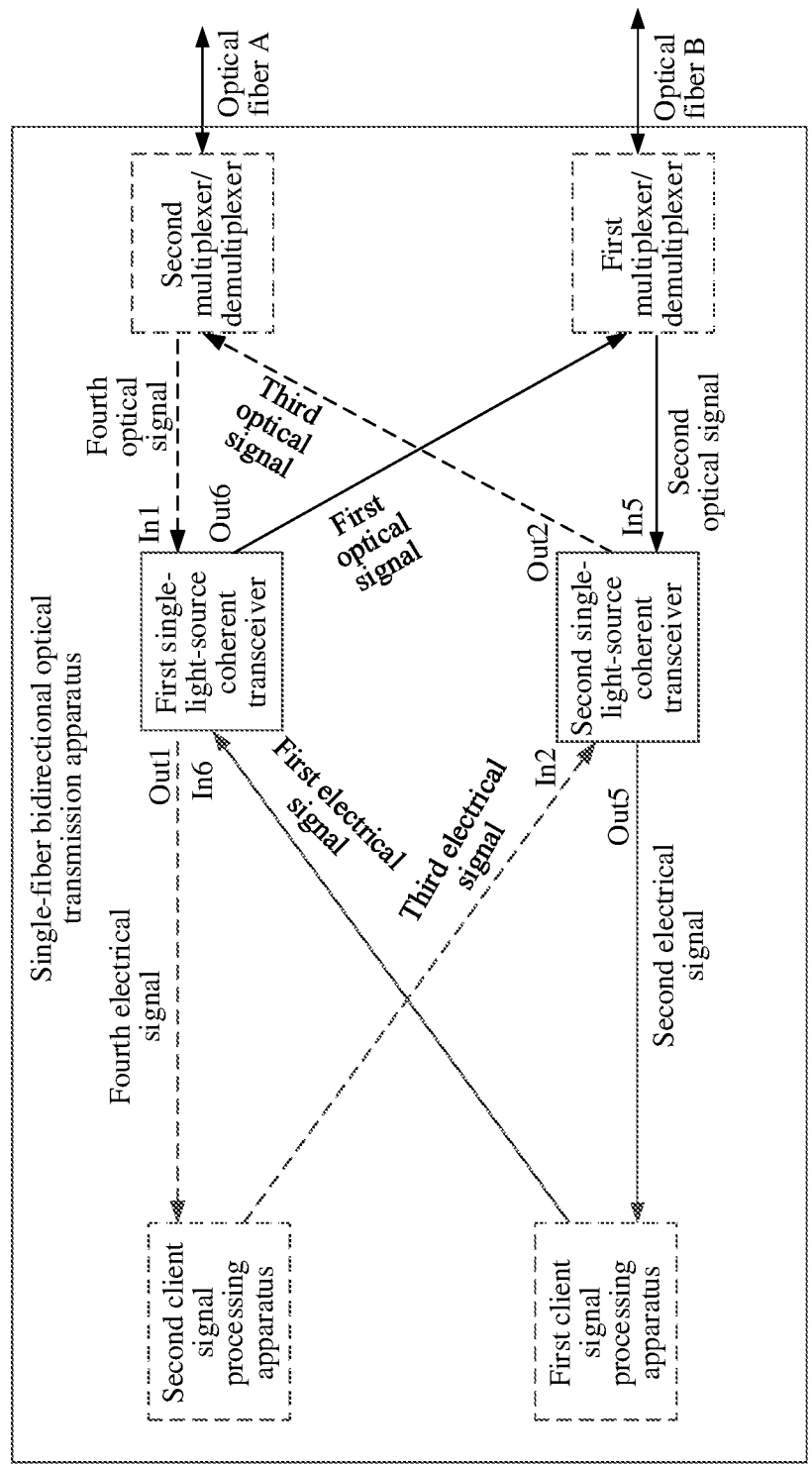
FIG. 15 is a schematic diagram 9 of a structure of a single-fiber bidirectional optical transmission apparatus according to an embodiment of this application.

Based on the single-fiber bidirectional optical transmission apparatus shown in FIG. 13, further, as shown in FIG. 15, the second single-light-source coherent transceiver is further configured to: receive a third electrical signal from a second client signal processing apparatus by using an electrical input end (for example, In2 in FIG. 15), convert the third electrical signal into a third optical signal, and send the third optical signal to a second multiplexer/demultiplexer by using an optical output end (for example, Out2 in FIG. 15). A wavelength of the third optical signal is the same as the wavelength of the second optical signal, but the optical signals are in opposite directions. The first single-light-source coherent transceiver is further configured to: receive a fourth optical signal from the second multiplexer/demultiplexer by using an optical input end (for example, In1 in FIG. 15), convert the fourth optical signal into a fourth electrical signal, and send the fourth electrical signal to the second client signal processing apparatus by using an electrical output end (for example, Out1 in FIG. 15). A wavelength of the fourth optical signal is the same as the wavelength of the first optical signal, but the optical signals are in opposite directions. In this solution, as the second single-light-source coherent optical transceiver sends the third optical signal to the second multiplexer/demultiplexer, and the first single-light-source coherent optical transceiver receives the fourth optical signal from the second multiplexer/demultiplexer, it can be learned that the optical output end of the second single-light-source coherent optical transceiver and the optical input end of the first single-light-source coherent optical transceiver are connected to a transceiver port of a same single-fiber bidirectional multiplexer/demultiplexer. In addition, as the second single-light-source coherent optical transceiver receives the third electrical signal from the second client signal processing apparatus, and the first single-light-source coherent optical transceiver sends the fourth electrical signal to the second client signal processing apparatus, it can be learned that the electrical input end of the second single-light-source coherent optical transceiver and the electrical output end of the first single-light-source coherent optical transceiver are connected to a same client signal processing apparatus. In addition, because wavelengths of optical signals of the first single-light-source coherent optical transceiver and the second single-light-source coherent optical transceiver are different, it is equivalent to first obtaining one virtual dual-light-source module in the single-fiber bidirectional optical transmission apparatus shown in FIG. 13 and then obtaining another virtual dual-light-source module with paired wavelengths. Therefore, the single-fiber bidirectional optical transmission apparatus can implement two channels of single-fiber bidirectional optical transmission. In conclusion, in this embodiment of this application, two channels of single-fiber bidirectional optical transmission may be implemented by using miniaturized single-light-source coherent optical transceivers.

It should be noted that wavelength combinations of the two virtual dual-light-source modules obtained in the single-fiber bidirectional optical transmission apparatus shown in FIG. 15 are exactly opposite. For example, it is assumed that an optical signal of the first single-light-source coherent optical transceiver uses a second wavelength, and an optical signal of the second single-light-source coherent optical transceiver uses a fourth wavelength. Then, one virtual dual-light-source module (a solid-line loop in FIG. 15) obtained in the single-fiber bidirectional optical transmission apparatus shown in FIG. 15 uses the fourth wavelength for receiving, and uses the second wavelength for sending. The other virtual dual-light-source module (a dashed-line loop in FIG. 15) obtained in the single-fiber bidirectional optical transmission apparatus shown in FIG. 15 uses the second wavelength for receiving, and uses the fourth wavelength for sending.

In this embodiment of this application, for deployment location relationships of the second multiplexer/demultiplexer and the second client signal processing apparatus with the single-fiber bidirectional optical transmission apparatus, refer to the description in the embodiment shown in FIG. 9. Details are not described herein again.

Figure 16:
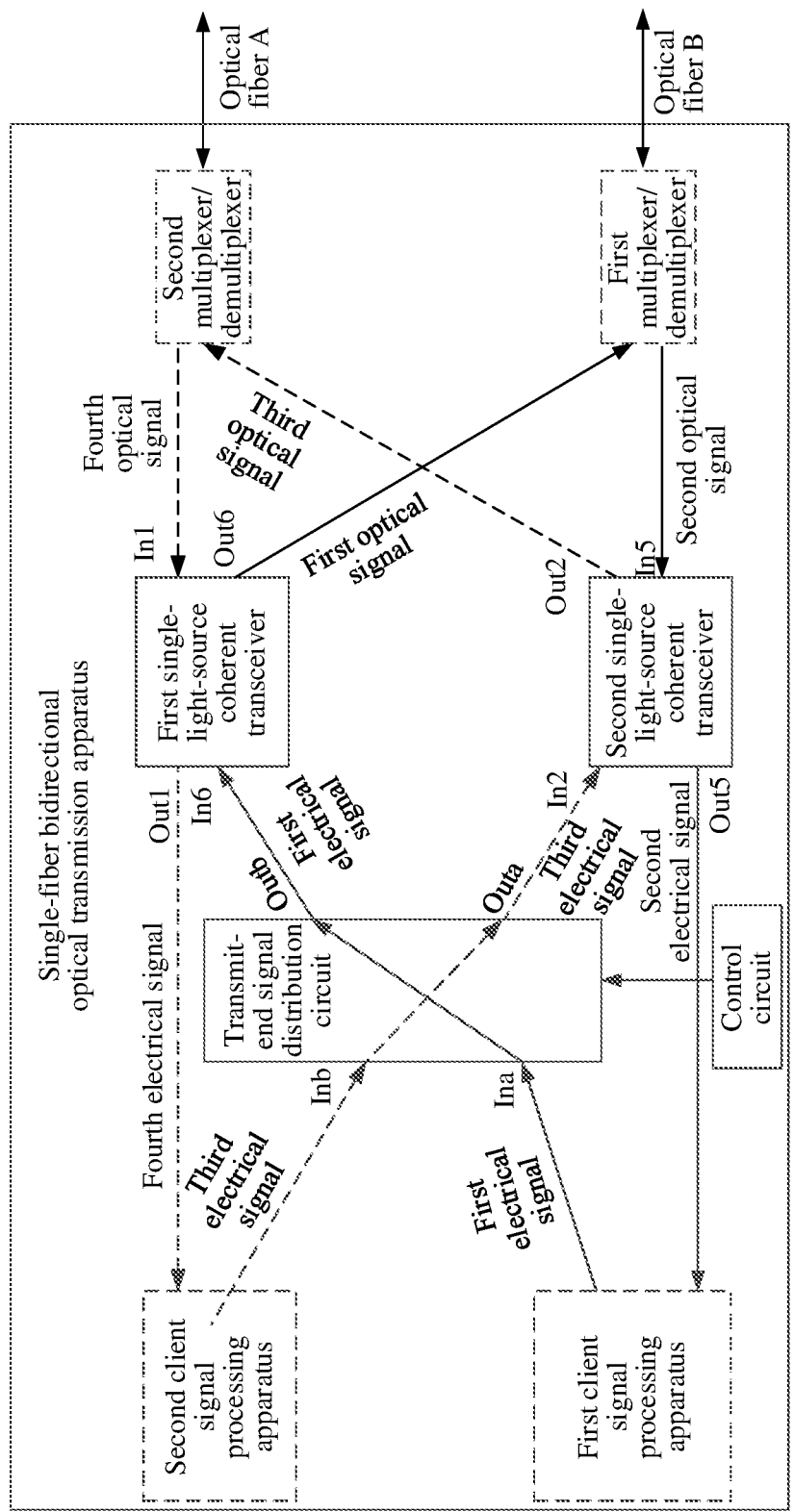
FIG. 16 is a schematic diagram 10 of a structure of a single-fiber bidirectional optical transmission apparatus according to an embodiment of this application.

Based on the single-fiber bidirectional optical transmission apparatus shown in FIG. 15, optionally, to improve scalability of the single-fiber bidirectional optical transmission apparatus, as shown in FIG. 16, the single-fiber bidirectional optical transmission apparatus further includes a transmit-end signal distribution circuit and a control circuit. For a schematic diagram of a structure of the transmit-end signal distribution circuit, refer to the signal distribution circuit shown in FIG. 5. Details are not described herein again. The transmit-end signal distribution circuit is configured to: receive the first electrical signal from the first client signal processing apparatus by using a first electrical input end (for example, Ina in FIG. 16), and receive the third electrical signal from the second client signal processing apparatus by using a second electrical input end (for example, Inb in FIG. 16). The control circuit is configured to: control the transmit-end signal distribution circuit to output the first electrical signal from a first electrical output end (for example, Outb in FIG. 16) of the transmit-end signal distribution circuit, and control the transmit-end signal distribution circuit to output the third electrical signal from a second electrical output end (for example, Outa in FIG. 16) of the transmit-end signal distribution circuit. The first electrical output end of the transmit-end signal distribution circuit is connected to the electrical input end (for example, In6 in FIG. 16) of the first single-light-source coherent transceiver, and the second electrical output end of the transmit-end signal distribution circuit is connected to the electrical input end (for example, In2 in FIG. 16) of the second single-light-source coherent transceiver. In other words, in this embodiment of this application, the control circuit controls the transmit-end signal distribution circuit to work in the state 1 shown in FIG. 6A, to implement a function of crossing, to the first single-light-source coherent transceiver, the first electrical signal output by the first client signal processing apparatus, and implement a function of crossing, to the second single-light-source coherent transceiver, the third electrical signal output by the second client signal processing apparatus. Certainly, the control circuit may alternatively control the transmit-end signal distribution circuit to work in the state shown in FIG. 6B, to be compatible with an existing function of implementing dual-fiber bidirectional optical transmission by using single-light-source coherent optical transceivers. This is not specifically limited in this embodiment of this application. For the existing function of implementing dual-fiber bidirectional optical transmission by using single-light-source coherent optical transceivers, refer to a conventional technology. Details are not described herein. Optionally, the control circuit may alternatively control the transmit-end signal distribution circuit to work in the state 3 shown in FIG. 6C or the state 4 shown in FIG. 6D. This is not specifically limited in this embodiment of this application.

Figure 17:
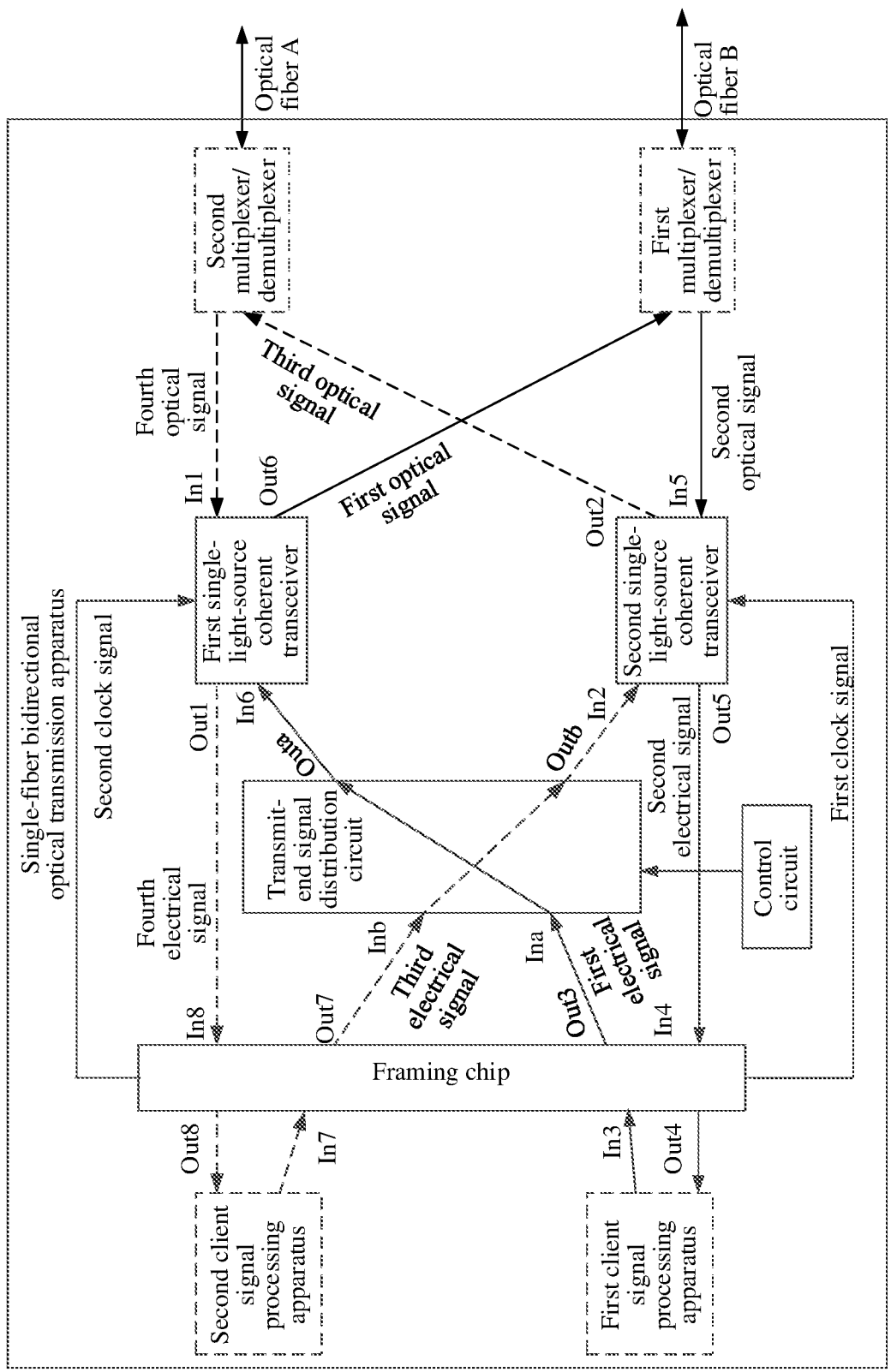
FIG. 17 is a schematic diagram 11 of a structure of a single-fiber bidirectional optical transmission apparatus according to an embodiment of this application.

In addition, in this embodiment of this application, when the first single-light-source coherent optical transceiver converts the first electrical signal into the first optical signal, the first electrical signal needs to cooperate with a second clock signal to generate the first optical signal. When the second single-light-source coherent optical transceiver converts the third electrical signal into the third optical signal, the third electrical signal needs to cooperate with a first clock signal to generate the third optical signal. In a possible implementation, in the single-fiber bidirectional optical transmission apparatus shown in FIG. 15 or FIG. 16, a working mode of the first single-light-source coherent optical transceiver and a working mode of the second single-light-source coherent optical transceiver need to be set to a self-recovery clock mode, so that the first single-light-source coherent optical transceiver generates the second clock signal and the second single-light-source coherent optical transceiver generates the first clock signal. In another possible implementation, based on the single-fiber bidirectional optical transmission apparatus shown in FIG. 15 or FIG. 16, the single-fiber bidirectional optical transmission apparatus provided in this embodiment of this application may further include a framing chip. The single-fiber bidirectional optical transmission apparatus shown in FIG. 16 is used as an example. As shown in FIG. 17, the framing chip is configured to provide the second clock signal to the first single-light-source coherent transceiver, and provide the first clock signal to the second single-light-source coherent transceiver. The first clock signal is extracted by the framing chip from an unprocessed third electrical signal received from the second client signal processing apparatus, and the second clock signal is extracted by the framing chip from an unprocessed first electrical signal received from the first client signal processing apparatus. This solution can ensure that a transmit-end optical signal and a client-side signal have a same clock source, thereby ensuring that a service of the single-fiber bidirectional optical transmission apparatus is normal.

In addition, in this embodiment of this application, the framing chip is further configured to implement conversion between a client-side electrical signal and a line-side electrical signal. Specifically, as shown in FIG. 17, the framing chip is further configured to receive the unprocessed first electrical signal from the first client signal processing apparatus by using a first electrical input end (for example, In3 in FIG. 17), and send the first electrical signal to the transmit-end signal distribution circuit by using a first electrical output end (for example, Out3 in FIG. 17). The framing chip is further configured to receive the second electrical signal from the second single-light-source coherent transceiver by using a second electrical input end (for example, In4 in FIG. 17), and send a processed second electrical signal to the first client signal processing apparatus by using a second electrical output end (for example, Out4 in FIG. 17). The framing chip is further configured to receive the unprocessed third electrical signal from the second client signal processing apparatus by using a third electrical input end (for example, In7 in FIG. 17), and send the third electrical signal to the transmit-end signal distribution circuit by using a third electrical output end (for example, Out7 in FIG. 17). The framing chip is further configured to receive the fourth electrical signal from the first single-light-source coherent transceiver by using a fourth electrical input end (for example, In8 in FIG. 17), and send a processed fourth electrical signal to the second client signal processing apparatus by using a fourth electrical output end (for example, Out8 in FIG. 17).

Figure 18:
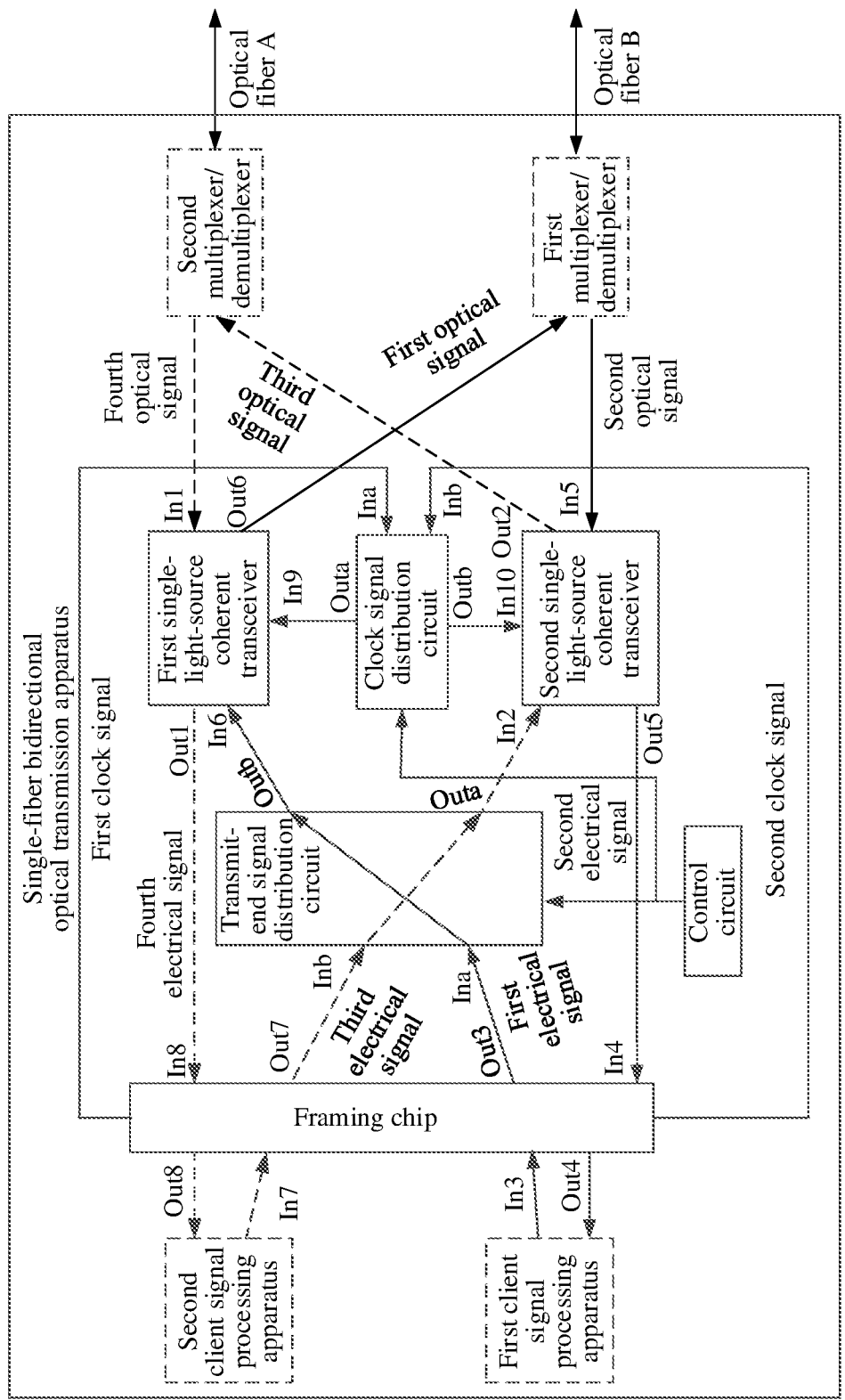
FIG. 18 is a schematic diagram 12 of a structure of a single-fiber bidirectional optical transmission apparatus according to an embodiment of this application.

Based on the single-fiber bidirectional optical transmission apparatus shown in FIG. 17, optionally, to improve scalability of the single-fiber bidirectional optical transmission apparatus, as shown in FIG. 18, the single-fiber bidirectional optical transmission apparatus further includes a clock signal distribution circuit. For a schematic diagram of a structure of the clock signal distribution circuit, refer to the signal distribution circuit shown in FIG. 5. Details are not described herein again. Correspondingly, that the framing chip is configured to provide the first clock signal to the second single-light-source coherent transceiver, and provide the second clock signal to the first single-light-source coherent transceiver includes: being configured to provide the first clock signal to a first clock input end (for example, Ina in FIG. 18) of the clock signal distribution circuit, and provide the second clock signal to a second clock input end (for example, Inb in FIG. 18) of the clock signal distribution circuit. In addition, the control circuit is further configured to: control the clock signal distribution circuit to output the first clock signal from a second clock output end (for example, Outb in FIG. 18) of the clock signal distribution circuit, and control the clock signal distribution circuit to output the second clock signal from a first clock output end (for example, Outa in FIG. 18) of the clock signal distribution circuit. The first clock output end of the clock signal distribution circuit is connected to a clock input end (for example, In9 in FIG. 18) of the first single-light-source coherent transceiver, and the second clock output end of the clock signal distribution circuit is connected to a clock input end (for example, Imo in FIG. 18) of the second single-light-source coherent transceiver. In other words, in this embodiment of this application, the control circuit controls the clock signal distribution circuit to work in the state 1 shown in FIG. 6A, to implement a function of crossing, to the second single-light-source coherent transceiver, the first clock signal output by the framing chip, and implement a function of crossing, to the first single-light-source coherent transceiver, the second clock signal output by the framing chip. Certainly, the control circuit may alternatively control the clock signal distribution circuit to work in the state shown in FIG. 6B, to be compatible with an existing function of implementing dual-fiber bidirectional optical transmission by using single-light-source coherent optical transceivers. This is not specifically limited in this embodiment of this application. For the existing function of implementing dual-fiber bidirectional optical transmission by using single-light-source coherent optical transceivers, refer to a conventional technology. Details are not described herein. Optionally, the control circuit may alternatively control the clock signal distribution circuit to work in the state 3 shown in FIG. 6C or the state 4 shown in FIG. 6D. This is not specifically limited in this embodiment of this application.

Figure 19:
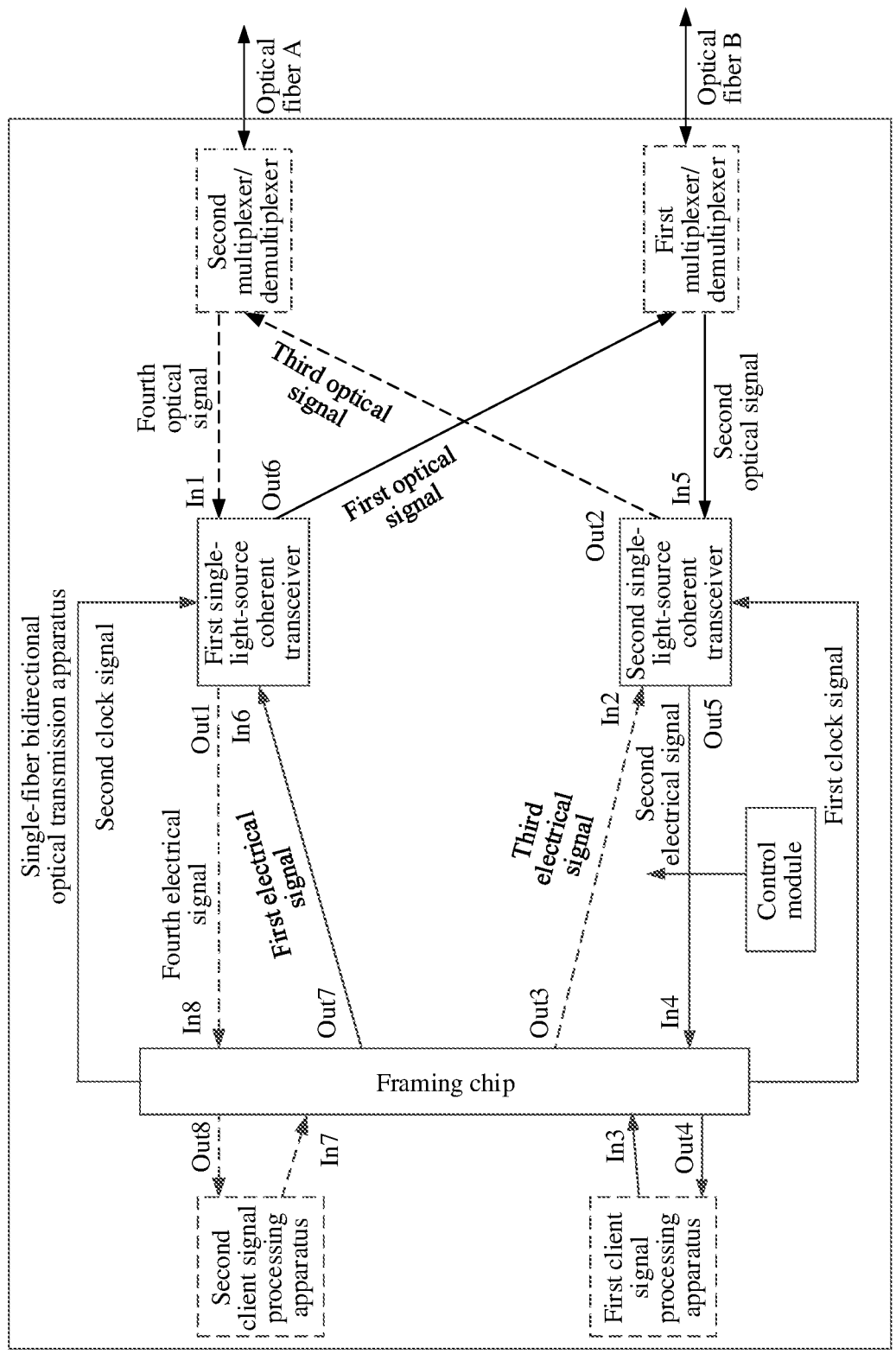
FIG. 19 is a schematic diagram 13 of a structure of a single-fiber bidirectional optical transmission apparatus according to an embodiment of this application.

Optionally, the transmit-end signal distribution circuit and the control circuit that are shown in FIG. 17 may be integrated into the framing chip. Alternatively, the transmit-end signal distribution circuit, the control circuit, and the clock signal distribution circuit shown in FIG. 18 may be integrated into the framing chip. In this case, a schematic diagram of a structure of a corresponding single-fiber bidirectional optical transmission apparatus may be shown in FIG. 19. The framing chip is further configured to receive the unprocessed first electrical signal from the first client signal processing apparatus by using the first electrical input end (for example, In3 in FIG. 19), and send the first electrical signal to the first single-light-source coherent transceiver by using the third electrical output end (for example, Out7 in FIG. 17). The framing chip is further configured to receive the second electrical signal from the second single-light-source coherent transceiver by using the second electrical input end (for example, In4 in FIG. 19), and send the processed second electrical signal to the first client signal processing apparatus by using the second electrical output end (for example, Out4 in FIG. 19). The framing chip is further configured to receive the unprocessed third electrical signal from the second client signal processing apparatus by using the third electrical input end (for example, In7 in FIG. 19), and send the third electrical signal to the second single-light-source coherent transceiver by using the first electrical output end (for example, Out3 in FIG. 19). The framing chip is further configured to receive the fourth electrical signal from the first single-light-source coherent transceiver by using the fourth electrical input end (for example, In8 in FIG. 19), and send the processed fourth electrical signal to the second client signal processing apparatus by using the fourth electrical output end (for example, Out8 in FIG. 19). In addition, the framing chip is further configured to provide the second clock signal to the first single-light-source coherent transceiver, and provide the first clock signal to the second single-light-source coherent transceiver. Functions of the receive-end signal distribution circuit and the control circuit in FIG. 17 or functions of the transmit-end signal distribution circuit, the control circuit, and the clock signal distribution circuit in FIG. 18 are implemented by the framing chip.

Figure 20:
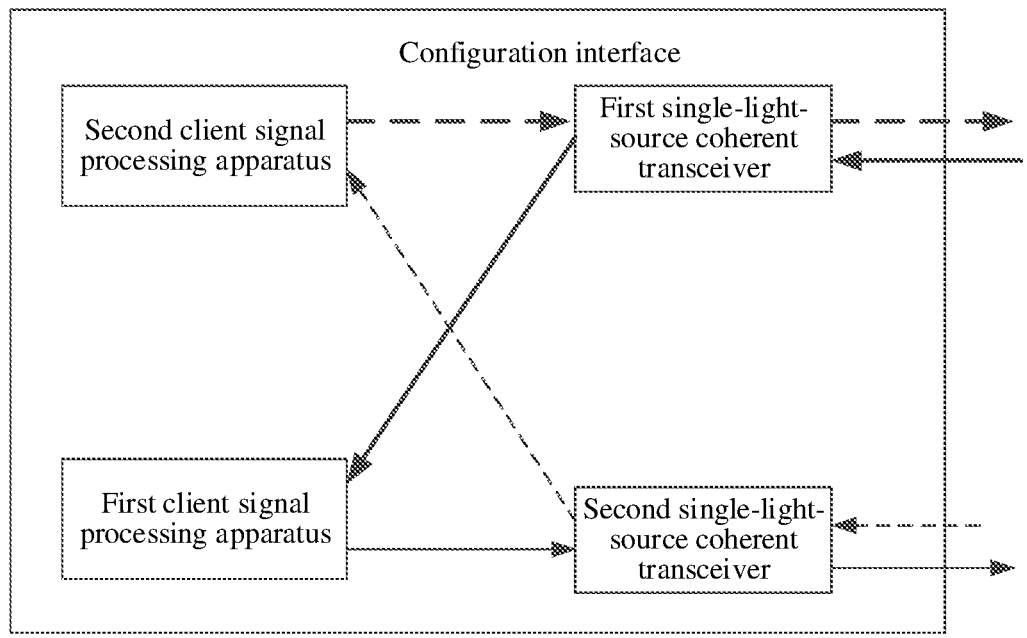
FIG. 20 is a schematic diagram 1 of a configuration interface according to an embodiment of this application.
Figure 21:
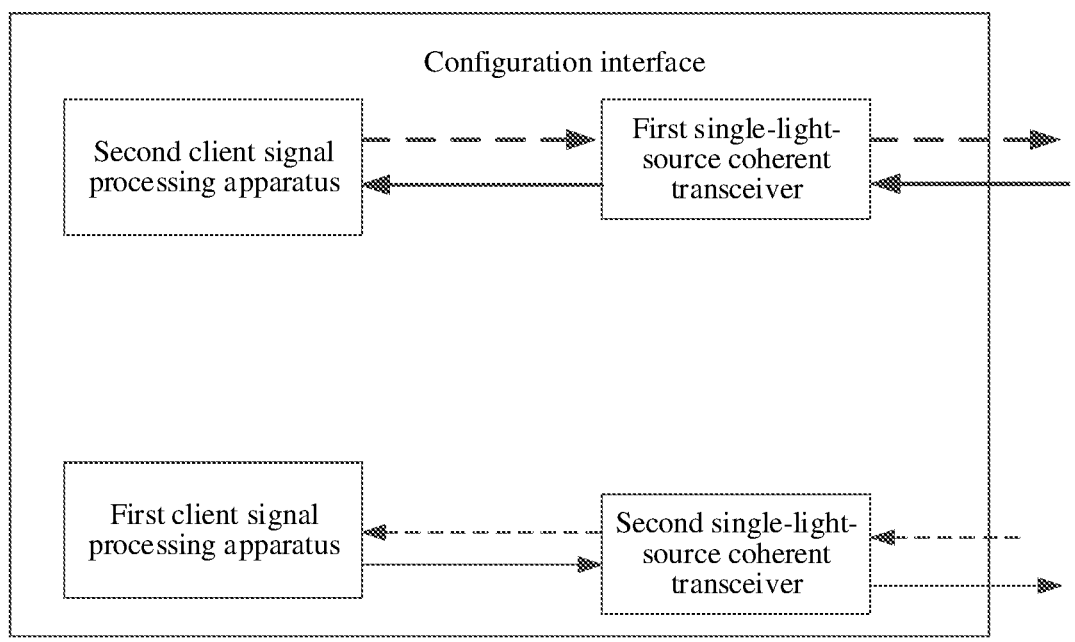
FIG. 21 is a schematic diagram 2 of a configuration interface according to an embodiment of this application.

Optionally, in embodiments of this application, when the single-fiber bidirectional optical transmission apparatus includes a receive-end signal distribution circuit or a transmit-end signal distribution circuit, and a multiplexer/demultiplexer (for example, the second multiplexer/demultiplexer and/or the first multiplexer/demultiplexer) is not integrated into the single-fiber bidirectional optical transmission apparatus (including a scenario in which the receive-end signal distribution circuit or the transmit-end signal distribution circuit is integrated into a framing chip), to be compatible with the existing function of implementing dual-fiber bidirectional optical transmission by using single-light-source coherent optical transceivers, a function may be selected by using a configuration interface. For example, when a user expects to use the single-fiber bidirectional optical transmission apparatus to implement the two-channel single-fiber bidirectional optical transmission function shown in FIG. 10, a configuration interface shown in FIG. 20 may be selected. That is, the control circuit is configured to control the receive-end signal distribution circuit to work in the state 1 shown in FIG. 6A. When the user expects to use the single-fiber bidirectional optical transmission apparatus to implement the dual-fiber bidirectional optical transmission function, a configuration interface shown in FIG. 21 may be selected. That is, the control circuit is configured to control the receive-end signal distribution circuit to work in the state 2 shown in FIG. 6B. Different line types in FIG. 20 and FIG. 21 represent different signal directions. Certainly, the user may alternatively select another configuration interface, so that the control circuit controls the receive-end signal distribution circuit to work in the state 3 shown in FIG. 6C or the state 4 shown in FIG. 6D. This is not specifically limited in embodiments of this application. The configuration interface selection enables the single-fiber bidirectional optical transmission apparatus to have stronger compatibility, more flexibility, and maximum commercial value.

Figure 22:
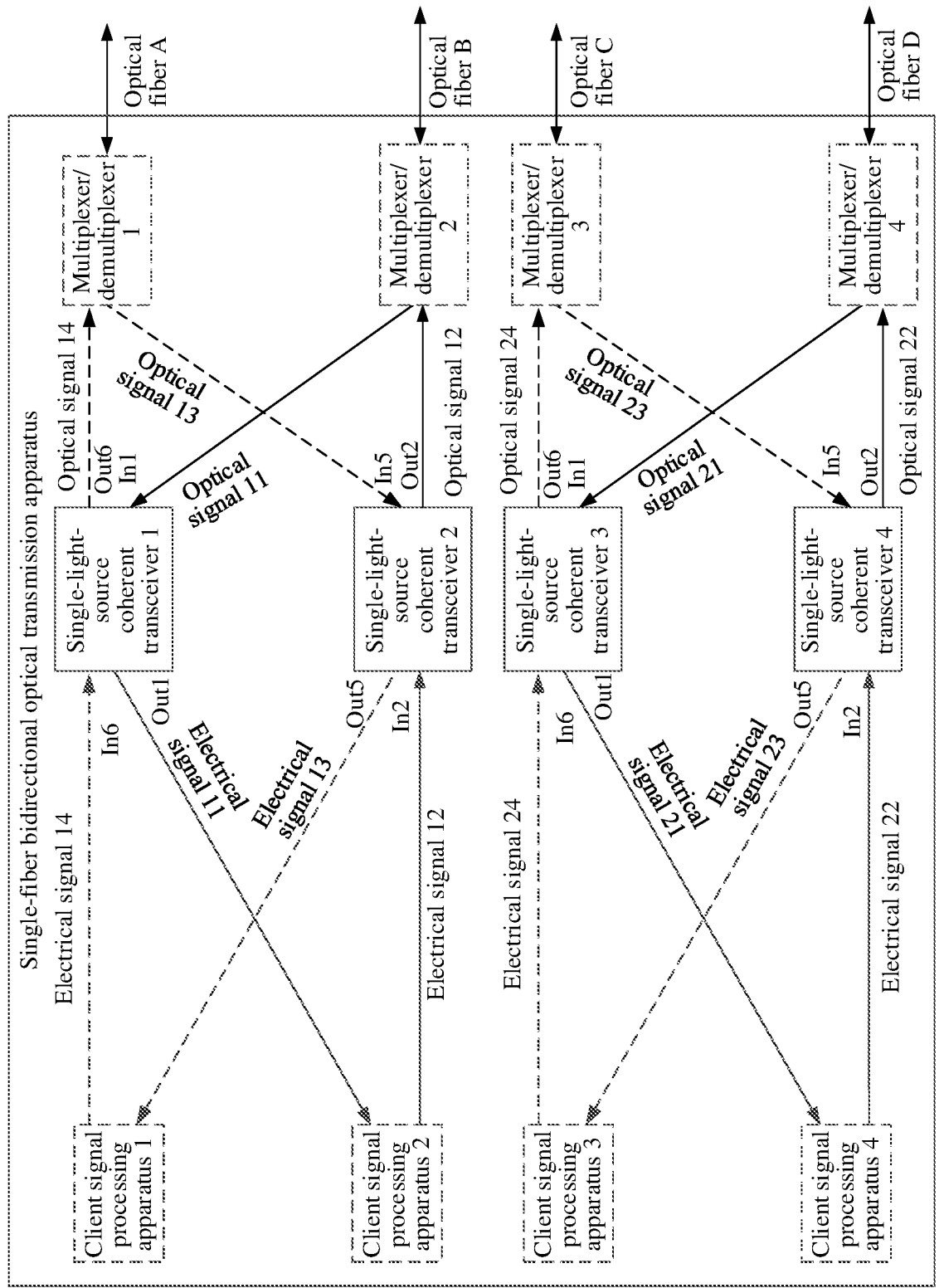
FIG. 22 is a schematic diagram 14 of a structure of a single-fiber bidirectional optical transmission apparatus according to an embodiment of this application.

The embodiments shown in FIG. 7 to FIG. 19 are all described by using an example in which the single-fiber bidirectional optical transmission apparatus includes two single-light-source coherent optical transceivers. Certainly, the single-fiber bidirectional optical transmission apparatus provided in embodiments of this application may alternatively include more than two single-light-source coherent optical transceivers, so that more than two channels of single-fiber bidirectional optical transmission are flexibly implemented by using a combination of transmit and receive signals of any two single-light-source coherent optical transceivers in the single-fiber bidirectional optical transmission apparatus. For example, FIG. 22 shows a single-fiber bidirectional optical transmission apparatus including more than two single-light-source coherent optical transceivers according to an embodiment of this application. The single-fiber bidirectional optical transmission apparatus can implement four channels of single-fiber bidirectional optical transmission, which is specifically as follows:

A first channel of single-fiber bidirectional transmit-end signal flow is as follows: A client signal processing apparatus 1 sends an electrical signal 14 to a single-light-source coherent optical transceiver 1. The single-light-source coherent optical transceiver 1 converts the electrical signal 14 into an optical signal 14, and sends the optical signal 14 to a multiplexer/demultiplexer 1 connected to an optical fiber A. Then, the optical signal 14 is sent to a peer device through the optical fiber A.

A first channel of single-fiber bidirectional receive-end signal flow is as follows: An optical signal 13 sent by the peer device reaches the multiplexer/demultiplexer 1 through the optical fiber A. The multiplexer/demultiplexer 1 sends the optical signal 13 to a single-light-source coherent optical transceiver 2. The single-light-source coherent optical transceiver 2 converts the optical signal 13 into an electrical signal 13, and sends the electrical signal 13 to the client signal processing apparatus 1.

A second channel of single-fiber bidirectional transmit-end signal flow is as follows: A client signal processing apparatus 2 sends an electrical signal 12 to the single-light-source coherent optical transceiver 2. The single-light-source coherent optical transceiver 2 converts the electrical signal 12 into an optical signal 12, and sends the optical signal 12 to a multiplexer/demultiplexer 2 connected to an optical fiber B. Then, the optical signal 12 is sent to a peer device through the optical fiber B.

A second channel of single-fiber bidirectional receive-end signal flow is as follows: An optical signal 11 sent by the peer device reaches the multiplexer/demultiplexer 2 through the optical fiber B. The multiplexer/demultiplexer 2 sends the optical signal 11 to the single-light-source coherent optical transceiver 1. The single-light-source coherent optical transceiver 1 converts the optical signal 11 into an electrical signal 11, and sends the electrical signal 11 to the client signal processing apparatus 2.

A third channel of single-fiber bidirectional transmit-end signal flow is as follows: A client signal processing apparatus 3 sends an electrical signal 24 to a single-light-source coherent optical transceiver 3. The single-light-source coherent optical transceiver 3 converts the electrical signal 24 into an optical signal 24, and sends the optical signal 24 to a multiplexer/demultiplexer 3 connected to an optical fiber C. Then, the optical signal 24 is sent to a peer device through the optical fiber C.

A third channel of single-fiber bidirectional receive-end signal flow is as follows: An optical signal 23 sent by the peer device reaches the multiplexer/demultiplexer 3 through the optical fiber C. The multiplexer/demultiplexer 3 sends the optical signal 23 to a single-light-source coherent optical transceiver 4. The single-light-source coherent optical transceiver 4 converts the optical signal 23 into an electrical signal 23, and sends the electrical signal 23 to the client signal processing apparatus 3.

A fourth channel of single-fiber bidirectional transmit-end signal flow is as follows: A client signal processing apparatus 4 sends an electrical signal 22 to the single-light-source coherent optical transceiver 4. The single-light-source coherent optical transceiver 4 converts the electrical signal 22 into an optical signal 22, and sends the optical signal 22 to a multiplexer/demultiplexer 4 connected to an optical fiber D. Then, the optical signal 22 is sent to a peer device through the optical fiber D.

A fourth channel of single-fiber bidirectional receive-end signal flow is as follows: An optical signal 21 sent by the peer device reaches the multiplexer/demultiplexer 4 through the optical fiber D. The multiplexer/demultiplexer 4 sends the optical signal 21 to the single-light-source coherent optical transceiver 3. The single-light-source coherent optical transceiver 3 converts the optical signal 21 into an electrical signal 21, and sends the electrical signal 21 to the client signal processing apparatus 4.

Figure 23:
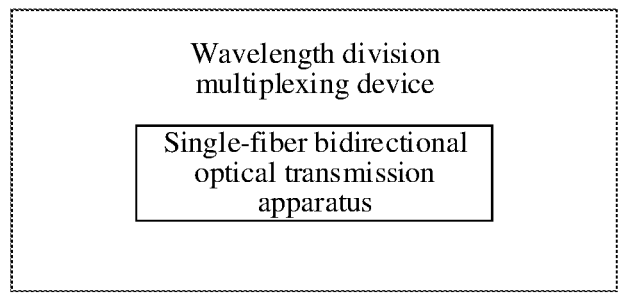
FIG. 23 is a schematic diagram of a structure of a wavelength division multiplexing device according to an embodiment of this application.

FIG. 23 shows a wavelength division multiplexing device according to an embodiment of this application. The wavelength division multiplexing device includes the single-fiber bidirectional optical transmission apparatus according to any one of the embodiments in FIG. 7 to FIG. 22. It should be noted that the wavelength division multiplexing device shown in FIG. 23 is merely a possible application scenario of the single-fiber bidirectional optical transmission apparatus provided in embodiments of this application, and does not constitute a limitation on technical solutions provided in embodiments of this application. A person of ordinary skill in the art may learn that, with evolution of a network architecture and emergence of a new service scenario, the single-fiber bidirectional optical transmission apparatus provided in embodiments of this application may be further used in another scenario. This is not specifically limited in embodiments of this application.

Figure 24:
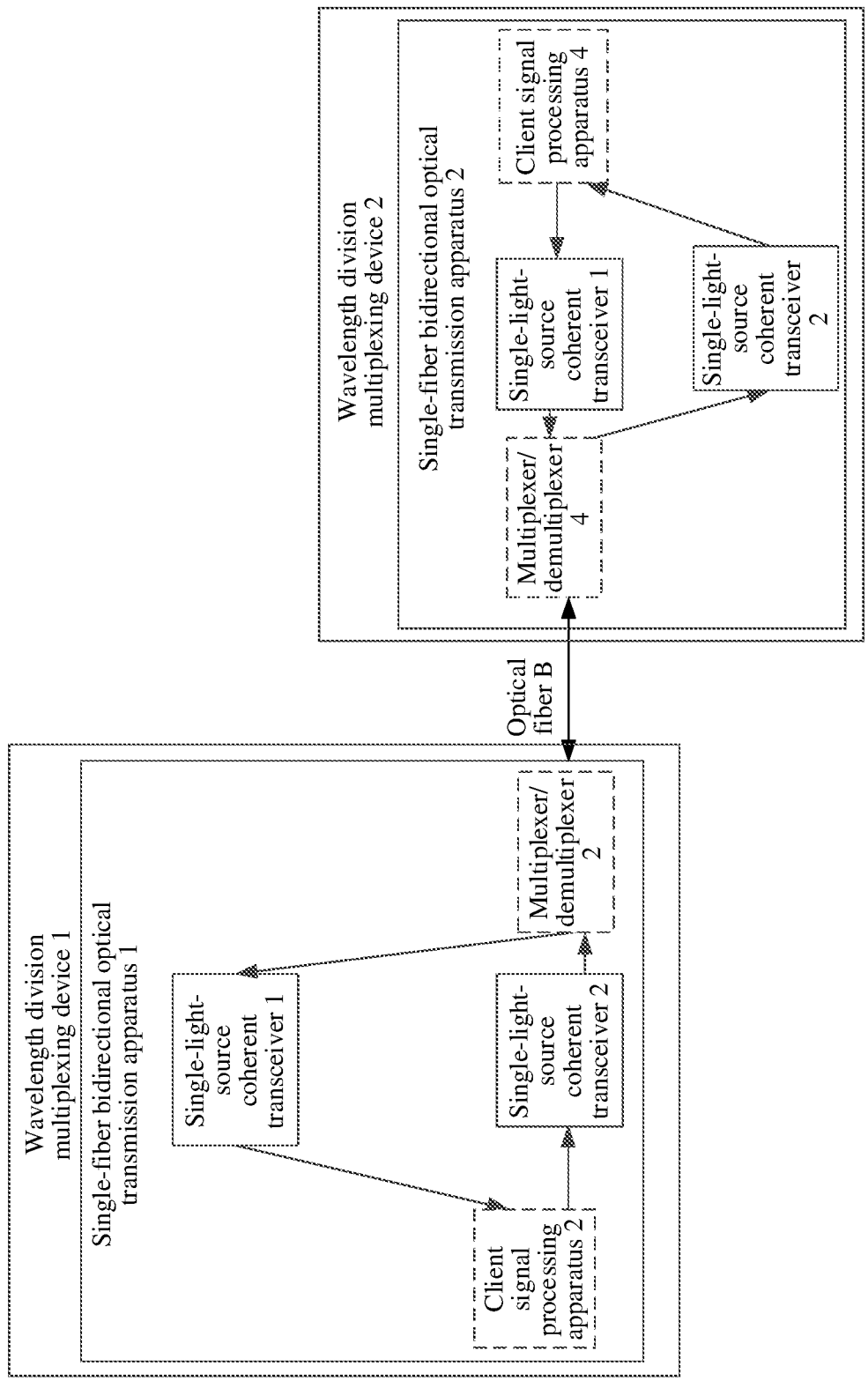
FIG. 24 is a schematic diagram 1 of an optical transmission system according to an embodiment of this application.
Figure 25:
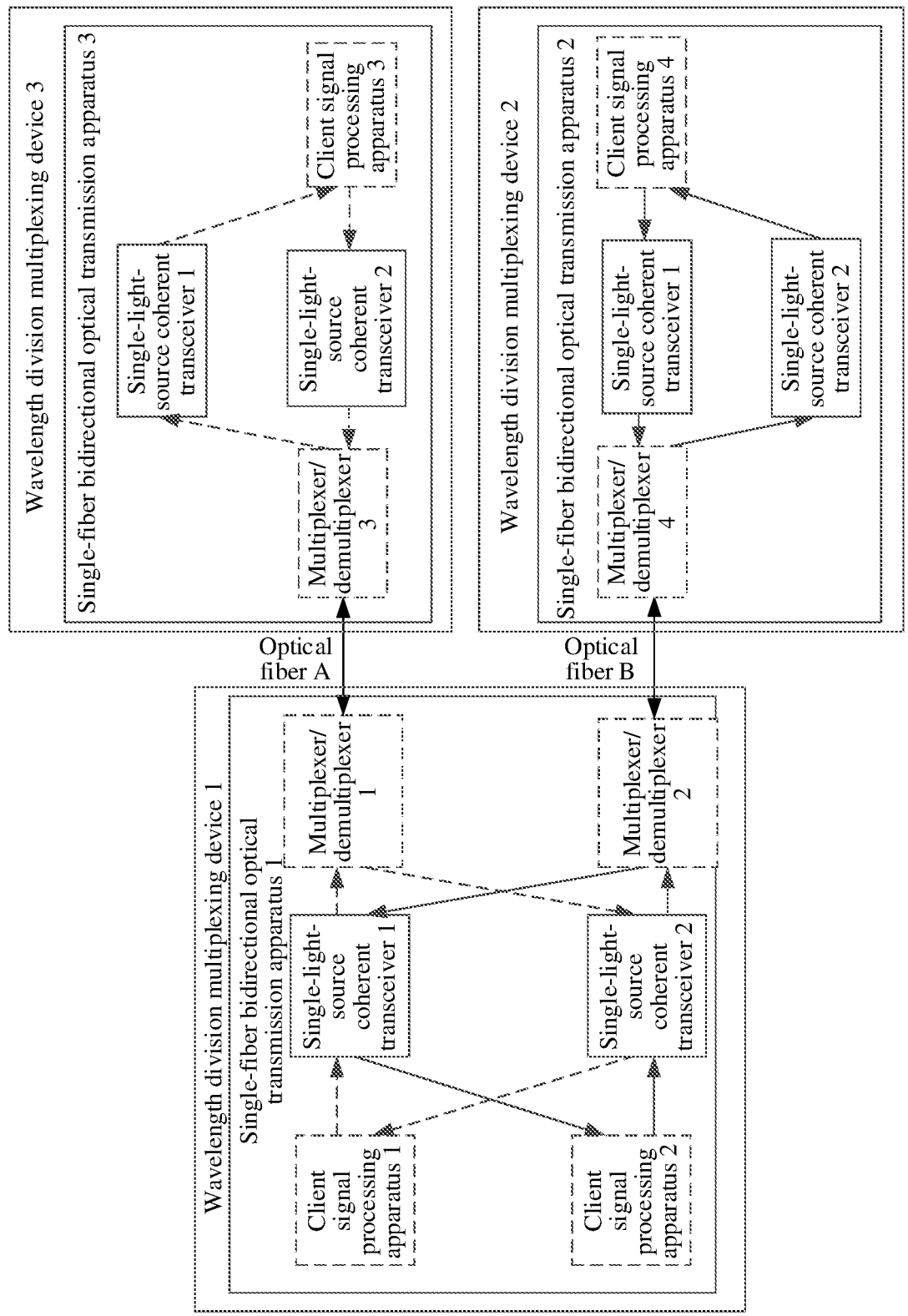
FIG. 25 is a schematic diagram 2 of an optical transmission system according to an embodiment of this application.
Figure 26:
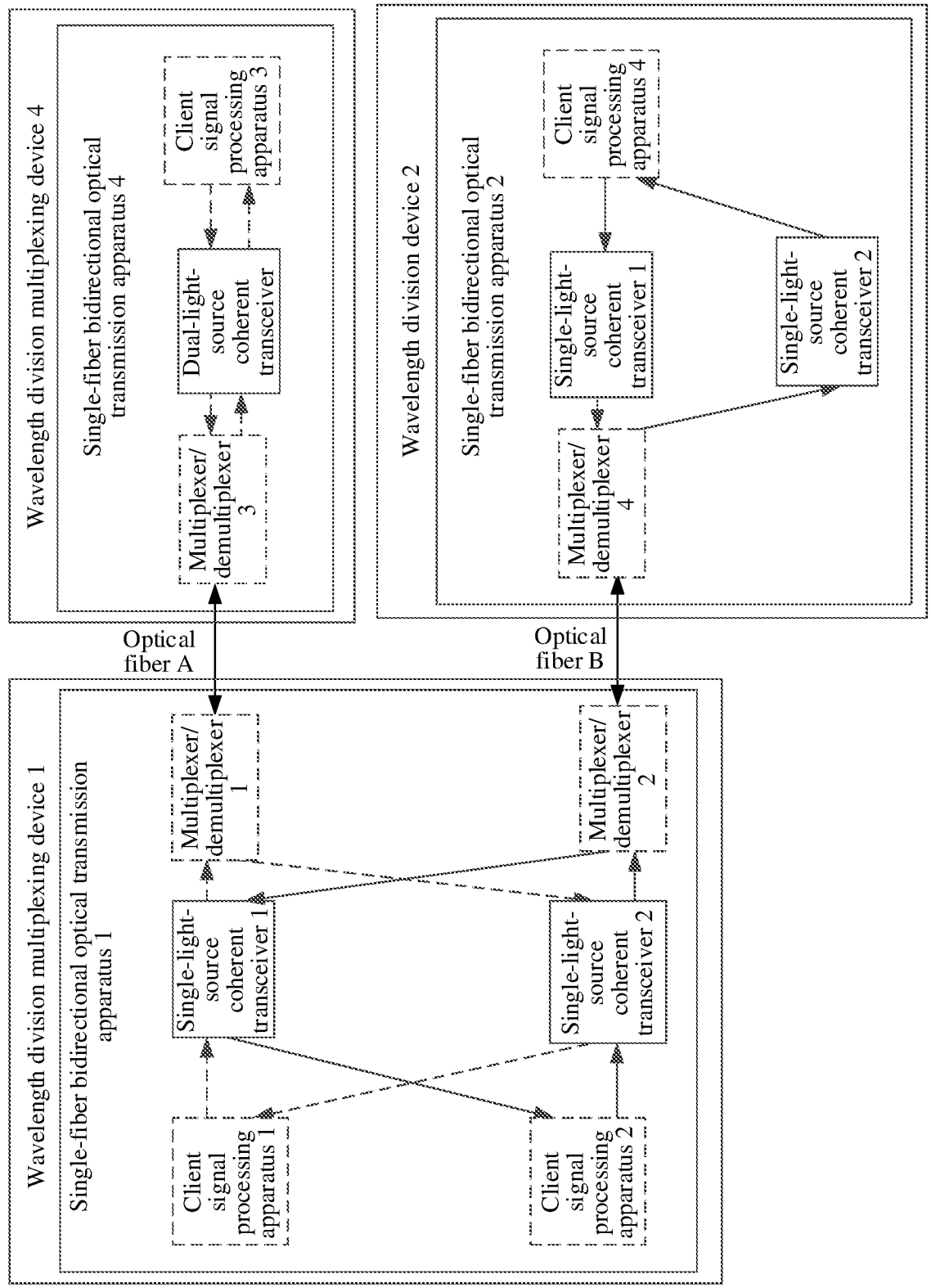
FIG. 26 is a schematic diagram 3 of an optical transmission system according to an embodiment of this application.

For example, the single-fiber bidirectional optical transmission apparatus provided in embodiments of this application is applied to a wavelength division multiplexing device. Optionally, an embodiment of this application further provides an optical transmission system. The optical transmission system includes one or more first wavelength division multiplexing devices, and the first wavelength division multiplexing device includes the single-fiber bidirectional optical transmission apparatus according to any one of the embodiments in FIG. 7 to FIG. 22. The following uses FIG. 24 to FIG. 26 as examples for description. Different line types in FIG. 24 to FIG. 26 represent different signal directions. This is uniformly described herein, and details are not described below again.

FIG. 24 shows an optical transmission system according to an embodiment of this application. The optical transmission system includes a wavelength division multiplexing device 1 and a wavelength division multiplexing device 2. The wavelength division multiplexing device 1 includes a single-fiber bidirectional optical transmission apparatus 1. The wavelength division multiplexing device 2 includes a single-fiber bidirectional optical transmission apparatus 2. The single-fiber bidirectional optical transmission apparatus 1 and the single-fiber bidirectional optical transmission apparatus 2 each include a single-light-source coherent optical transceiver 1 and a single-light-source coherent optical transceiver 2. It is assumed that an optical signal of the single-light-source coherent optical transceiver 1 uses a second wavelength, and an optical signal of the single-light-source coherent optical transceiver 2 uses a fourth wavelength. Then, through an optical fiber B, the wavelength division multiplexing device 1 may send an optical signal of the fourth wavelength in a direction from a client signal processing apparatus 2 to a client signal processing apparatus 4 to the wavelength division multiplexing device 2, and the wavelength division multiplexing device 2 may send an optical signal of the second wavelength in a direction from the client signal processing apparatus 4 to the client signal processing apparatus 2 to the wavelength division multiplexing device 1.

Optionally, on the basis that the wavelength division multiplexing device 1 shown in FIG. 24 has implemented one channel of single-fiber bidirectional optical transmission, when the single-fiber bidirectional optical transmission apparatus 1 in the wavelength division multiplexing device 1 further includes a client signal processing apparatus 1 and a multiplexer/demultiplexer 1, the wavelength division multiplexing device 1 may further cooperate with another first wavelength division multiplexing device or a second wavelength division multiplexing device to implement a second channel of single-fiber bidirectional optical transmission. In embodiments of this application, a wavelength division multiplexing device including a dual-light-source coherent optical transceiver is referred to as a second wavelength division multiplexing device. This is uniformly described herein, and details are not described below again.

For example, as shown in FIG. 25, the optical transmission system may further include a wavelength division multiplexing device 3. The wavelength division multiplexing device 3 includes a single-fiber bidirectional optical transmission apparatus 3. The single-fiber bidirectional optical transmission apparatus 3 includes a single-light-source coherent optical transceiver 1 and a single-light-source coherent optical transceiver 2. Through an optical fiber A, the wavelength division multiplexing device 1 may send an optical signal of the second wavelength in a direction from the client signal processing apparatus 1 to a client signal processing apparatus 3 to the wavelength division multiplexing device 3, and the wavelength division multiplexing device 3 may send an optical signal of the fourth wavelength in a direction from the client signal processing apparatus 3 to the client signal processing apparatus 1 to the wavelength division multiplexing device 1.

[oils] Alternatively, for example, as shown in FIG. 26, the optical transmission system may further include a wavelength division multiplexing device 4. The wavelength division multiplexing device 4 includes a single-fiber bidirectional optical transmission apparatus 4. The single-fiber bidirectional optical transmission apparatus 4 includes a dual-light-source coherent optical transceiver. Through an optical fiber A, the wavelength division multiplexing device 1 may send an optical signal of the second wavelength in a direction from the client signal processing apparatus 1 to a client signal processing apparatus 3 to the wavelength division multiplexing device 4, and the wavelength division multiplexing device 4 may send an optical signal of the fourth wavelength in a direction from the client signal processing apparatus 3 to the client signal processing apparatus 1 to the wavelength division multiplexing device 1.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An apparatus, comprising:
   a first single-light-source coherent optical transceiver, configured to:
      receive a first optical signal from a first multiplexer/demultiplexer;
      convert the first optical signal into a first electrical signal; and
      send the first electrical signal to a first apparatus; and
   a second single-light-source coherent optical transceiver, configured to:
      receive a second electrical signal from the first apparatus;
      convert the second electrical signal into a second optical signal;
      send the second optical signal to the first multiplexer/demultiplexer, wherein a wavelength of the second optical signal is different from a wavelength of the first optical signal;
      receive a third optical signal from a second multiplexer/demultiplexer;
      convert the third optical signal into a third electrical signal; and
      send the third electrical signal to a second apparatus, wherein a wavelength of the third optical signal is the same as the wavelength of the second optical signal, and the second optical signal and the third optical signal are sent in opposite directions; and
   wherein the first single-light-source coherent optical transceiver is further configured to:
      receive a fourth electrical signal from the second apparatus;
      convert the fourth electrical signal into a fourth optical signal; and
      send the fourth optical signal to the second multiplexer/demultiplexer, wherein a wavelength of the fourth optical signal is the same as the wavelength of the first optical signal, and the fourth optical signal and the first optical signal are sent in opposite directions.

2. The apparatus according to claim 1, further comprising:
   a receive-end signal distribution circuit, configured to:
      receive the first electrical signal from the first single-light-source coherent optical transceiver by using a first electrical input end; and
      receive the third electrical signal from the second single-light-source coherent optical transceiver by using a second electrical input end; and
   a control circuit, configured to:
      control the receive-end signal distribution circuit to output the first electrical signal from a first electrical output end of the receive-end signal distribution circuit; and control the receive-end signal distribution circuit to output the third electrical signal from a second electrical output end of the receive-end signal distribution circuit, wherein the first electrical output end of the receive-end signal distribution circuit is connected to an electrical input end of the first apparatus, and the second electrical output end of the receive-end signal distribution circuit is connected to an electrical input end of the second apparatus.

3. The apparatus according to claim 2, further comprising:
a framing chip, configured to:
  receive the first electrical signal from the receive-end signal distribution circuit, and send a processed first electrical signal to the first apparatus;
  receive an unprocessed second electrical signal from the first apparatus, and send the second electrical signal to the second single-light-source coherent optical transceiver;
  receive the third electrical signal from the receive-end signal distribution circuit, and send a processed third electrical signal to the second apparatus;
  receive an unprocessed fourth electrical signal from the second apparatus, and send the fourth electrical signal to the first single-light-source coherent optical transceiver; and
  provide a first clock signal to the first single-light-source coherent optical transceiver, and provide a second clock signal to the second single-light-source coherent optical transceiver, wherein the first clock signal is extracted by the framing chip from the unprocessed fourth electrical signal received from the second apparatus, and the second clock signal is extracted by the framing chip from the unprocessed second electrical signal received from the first apparatus.

4. The apparatus according to claim 1, wherein:
the apparatus further comprises the first multiplexer/demultiplexer and the second multiplexer/demultiplexer.

5. The apparatus according to claim 4, wherein:
the apparatus further comprises the second apparatus and the first apparatus; or
the apparatus is connected to the second apparatus and the first apparatus.

6. The apparatus according to claim 1, further comprising:
a framing chip, configured to:
  receive the first electrical signal from the first single-light-source coherent optical transceiver, and send a processed first electrical signal to the first apparatus;
  receive an unprocessed second electrical signal from the first apparatus, and send the second electrical signal to the second single-light-source coherent optical transceiver; and
  provide a second clock signal to the second single-light-source coherent optical transceiver, wherein the second clock signal is extracted by the framing chip from the unprocessed second electrical signal received from the first apparatus.

7. The apparatus according to claim 1, wherein:
the apparatus further comprises the first multiplexer/demultiplexer; or
the apparatus is connected to the first multiplexer/demultiplexer.

8. The apparatus according to claim 1, wherein
the apparatus further comprises the first apparatus; or
the apparatus is connected to the first apparatus.

9. The apparatus according to claim 1, wherein:
the apparatus is connected to the first multiplexer/demultiplexer and the second multiplexer/demultiplexer.

10. A method, comprising:
receiving, by a first single-light-source coherent transceiver of an optical transmission apparatus, a first electrical signal from a first apparatus of the optical transmission apparatus;
converting, by the first single-light-source coherent transceiver, the first electrical signal into a first optical signal;
sending, by the first single-light-source coherent transceiver, the first optical signal to a first multiplexer/demultiplexer;
receiving, by a second single-light-source coherent transceiver of the optical transmission apparatus, a second optical signal from the first multiplexer/demultiplexer;
converting, by the second single-light-source coherent transceiver, the second optical signal into a second electrical signal;
sending, by the second single-light-source coherent transceiver, the second electrical signal to the first apparatus, wherein a wavelength of the second optical signal is different from a wavelength of the first optical signal;
receiving, by the second single-light-source coherent transceiver, a third electrical signal from a second apparatus of the optical transmission apparatus, converting the third electrical signal into a third optical signal, and sending the third optical signal to a second multiplexer/demultiplexer, wherein a wavelength of the third optical signal is the same as the wavelength of the second optical signal, and the third optical signal and the second optical signal are sent in opposite directions; and
receiving, by the first single-light-source coherent transceiver, a fourth optical signal from the second multiplexer/demultiplexer, converting the fourth optical signal into a fourth electrical signal, and sending the fourth electrical signal to the second apparatus, wherein a wavelength of the fourth optical signal is the same as the wavelength of the first optical signal, and the first optical signal and the fourth optical signal are sent in opposite directions.

11. The method according to claim 10, further comprising:
receiving, by a transmit-end signal distribution circuit of the optical transmission apparatus, the first electrical signal from the first apparatus by using a first electrical input end of the transmit-end signal distribution circuit, and receiving the third electrical signal from the second apparatus by using a second electrical input end of the transmit-end signal distribution circuit; and
controlling, by a control circuit of the optical transmission apparatus, the transmit-end signal distribution circuit to output the first electrical signal from a first electrical output end of the transmit-end signal distribution circuit, and controlling the transmit-end signal distribution circuit to output the third electrical signal from a second electrical output end of the transmit-end signal distribution circuit, wherein the first electrical output end of the transmit-end signal distribution circuit is connected to an electrical input end of the first single-light-source coherent transceiver, and the second electrical output end of the transmit-end signal distribution circuit is connected to an electrical input end of the second single-light-source coherent transceiver.

12. The method according to claim 11, further comprising:
- receiving, by a framing chip of the optical transmission apparatus, an unprocessed first electrical signal from the first apparatus, and sending the first electrical signal to the transmit-end signal distribution circuit;
- receiving, by the framing chip, the second electrical signal from the second single-light-source coherent transceiver, and sending a processed second electrical signal to the first apparatus;
- receiving, by the framing chip, an unprocessed third electrical signal from the second apparatus, and sending the third electrical signal to the transmit-end signal distribution circuit;
- receiving the fourth electrical signal from the first single-light-source coherent transceiver, and sending a processed fourth electrical signal to the second apparatus; and
- providing, by the framing chip, a first clock signal to the second single-light-source coherent transceiver, and providing a second clock signal to the first single-light-source coherent transceiver, wherein the first clock signal is extracted by the framing chip from the unprocessed third electrical signal received from the second apparatus, and the second clock signal is extracted by the framing chip from the unprocessed first electrical signal received from the first apparatus.

13. The method according to claim 12, wherein:
providing, by the framing chip, the first clock signal to the second single-light-source coherent transceiver, and providing the second clock signal to the first single-light-source coherent transceiver, comprises:
- providing, by the framing chip, the first clock signal to a first clock input end of a clock signal distribution circuit of the optical transmission apparatus, and providing the second clock signal to a second clock input end of the clock signal distribution circuit; and the method further comprises:
- controlling, by the control circuit, the clock signal distribution circuit to output the first clock signal from a second clock output end of the clock signal distribution circuit, and controlling the clock signal distribution circuit to output the second clock signal from a first clock output end of the clock signal distribution circuit, wherein the first clock output end of the clock signal distribution circuit is connected to a clock input end of the first single-light-source coherent transceiver, and the second clock output end of the clock signal distribution circuit is connected to a clock input end of the second single-light-source coherent transceiver.

14. The method according to claim 13, wherein:
the optical transmission apparatus comprises the first multiplexer/demultiplexer and the second multiplexer/demultiplexer; or
the optical transmission apparatus is connected to the first multiplexer/demultiplexer and the second multiplexer/demultiplexer.

15. The method according to claim 14, wherein:
the optical transmission apparatus comprises the second apparatus and the first; or
the optical transmission apparatus is connected to the second apparatus and the first apparatus.

16. The method according to claim 10, further comprising:
- receiving, by a framing chip of the optical transmission apparatus, an unprocessed first electrical signal from the first apparatus, and sending the first electrical signal to the first single-light-source coherent transceiver;
- receiving, by the framing chip, the second electrical signal from the second single-light-source coherent transceiver, and sending a processed second electrical signal to the first apparatus; and
- providing, by the framing chip, a second clock signal to the first single-light-source coherent transceiver, wherein the second clock signal is extracted by the framing chip from the unprocessed first electrical signal received from the first apparatus.

17. The method according to claim 10, wherein:
the optical transmission apparatus comprises the first multiplexer/demultiplexer; or
the optical transmission apparatus is connected to the first multiplexer/demultiplexer.

18. The method according to claim 10, wherein:
the optical transmission apparatus comprises the first apparatus.

19. The method according to claim 10, wherein:
the optical transmission apparatus is connected to the first apparatus.

20. A device, comprising:
an optical transmission apparatus, wherein the optical transmission apparatus comprises:
- a first single-light-source coherent optical transceiver, configured to:
  - receive a first optical signal from a first multiplexer/demultiplexer, convert the first optical signal into a first electrical signal, and send the first electrical signal to a first apparatus; and
- a second single-light-source coherent optical transceiver, configured to:
  - receive a second electrical signal from the first apparatus, convert the second electrical signal into a second optical signal, and send the second optical signal to the first multiplexer/demultiplexer, wherein a wavelength of the second optical signal is different from a wavelength of the first optical signal;
  - receive a third optical signal from a second multiplexer/demultiplexer;
  - convert the third optical signal into a third electrical signal; and
  - send the third electrical signal to a second apparatus, wherein a wavelength of the third optical signal is the same as the wavelength of the second optical signal, and the second optical signal and the third optical signal are sent in opposite directions; and
wherein the first single-light-source coherent optical transceiver is further configured to:
  - receive a fourth electrical signal from the second apparatus;
  - convert the fourth electrical signal into a fourth optical signal; and
  - send the fourth optical signal to the second multiplexer/demultiplexer, wherein a wavelength of the fourth optical signal is the same as the wavelength of the first optical signal, and the fourth optical signal and the first optical signal are sent in opposite directions.

* * * * *